US 10,067,757 B2

(12) United States Patent
Weber et al.

(10) Patent No.: US 10,067,757 B2
(45) Date of Patent: Sep. 4, 2018

(54) DYNAMIC UPDATE OF AN APPLICATION IN COMPILATION AND DEPLOYMENT WITH HOT-SWAPPING

(71) Applicant: Google Inc., Mountain View, CA (US)

(72) Inventors: Arnaud Claude Weber, Saratoga, CA (US); Sivakumar Velusamy, San Francisco, CA (US); Stephanie Saad Cuthbertson, Kirkland, WA (US); Christopher Matthew Warrington, Sunnyvale, CA (US); Jerome Dochez, Palo Alto, CA (US); Torbjorn Norbye, Pleasant Hill, CA (US); Esteban de la Canal, Campbell, CA (US); Jomo Fisher, Mountain View, CA (US); Xavier Ducrohet, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 25 days.

(21) Appl. No.: 15/275,584

(22) Filed: Sep. 26, 2016

(65) Prior Publication Data
US 2017/0147306 A1    May 25, 2017

Related U.S. Application Data

(60) Provisional application No. 62/258,335, filed on Nov. 20, 2015.

(51) Int. Cl.
*G06F 9/44*    (2018.01)
*G06F 8/65*    (2018.01)
(Continued)

(52) U.S. Cl.
CPC .................. *G06F 8/65* (2013.01); *G06F 8/41* (2013.01); *G06F 8/48* (2013.01); *G06F 8/60* (2013.01);
(Continued)

(58) Field of Classification Search
CPC .................. G06F 8/443; G06F 8/48
(Continued)

(56) References Cited

U.S. PATENT DOCUMENTS 6,330,573 B1    12/2001    Salisbury et al.
6,857,119 B1 *   2/2005    Desai ................ G06F 8/67
                                               717/140
(Continued)

FOREIGN PATENT DOCUMENTS

WO    0026780 A1    5/2000

OTHER PUBLICATIONS

Subramanian et al., "Dynamic Software Updates: A VM-centric Approach", 2009.*
(Continued)

*Primary Examiner* — Phillip H Nguyen
(74) *Attorney, Agent, or Firm* — Shumaker & Sieffert, P.A.

(57) ABSTRACT

In some examples, method includes, in response to receiving an initial user input that causes a builder computing system to compile a set of source code for an application into a set of compiled targets, deploying the set of compiled targets to initiate execution of the application, wherein a subset of the set of source code is compiled into an initial subset of the set of compiled targets; after modification to at least the subset of the set of source code, receiving a subsequent user input that causes the builder computing system to compile at least the subset of the set of source code into an updated subset of the set of compiled targets; and in response to determining that the updated subset differs from the initial subset, deploying the updated subset to update the application based on the updated subset without terminating execution of the application.

20 Claims, 10 Drawing Sheets

(51) Int. Cl.
  *G06F 8/41* (2018.01)
  *G06F 8/60* (2018.01)
  *G06F 11/36* (2006.01)
  *G06F 8/71* (2018.01)
  *G06F 8/656* (2018.01)

(52) U.S. Cl.
  CPC ............... *G06F 8/656* (2018.02); *G06F 8/71* (2013.01); *G06F 11/3664* (2013.01); *G06F 11/3668* (2013.01)

(58) Field of Classification Search
  USPC ........................................ 717/145, 158, 124
  See application file for complete search history.

(56) References Cited

U.S. PATENT DOCUMENTS

| | | | |
|---|---|---|---|
| 7,778,968 | B2 | 8/2010 | Cherry |
| 7,904,484 | B2 | 3/2011 | Culpepper |
| 8,166,448 | B2 | 4/2012 | Mitra et al. |
| 8,495,619 | B2 | 7/2013 | Tammana |
| 2004/0107416 | A1* | 6/2004 | Buban .................... G06F 8/67 717/170 |
| 2008/0295064 | A1 | 11/2008 | Mitra et al. |
| 2010/0199259 | A1 | 8/2010 | Quinn et al. |
| 2013/0117733 | A1 | 5/2013 | Ahmed et al. |
| 2013/0305218 | A1 | 11/2013 | Hirsch et al. |
| 2013/0339926 | A1* | 12/2013 | Raundahl Gregersen ............... G06F 8/31 717/114 |
| 2014/0380272 | A1* | 12/2014 | Hertweck ........... G06F 11/3664 717/113 |
| 2015/0007158 | A1 | 1/2015 | Marr et al. |
| 2015/0339104 | A1* | 11/2015 | Frenkiel ................ G06F 8/20 717/113 |

OTHER PUBLICATIONS

Gregeresen, et al., "Dynamic update of Java applications—balancing change flexibility vs programming transparency," Journal of Software Maintenance and Evolution: Research and Practice, vol. 21, No. 2, Mar. 2009, pp. 81-112.
Gregersen, et al., "Towards a Dynamic-Update-Enabled JVM," Proceedings of the Workshop on AOP and Meta-Data for Software Evolution: Jul. 2009, 7 pp.
International Search Report and Written Opinion from International Application No. PCT/US2016/062771, dated Mar. 3, 2017, 17 pp.
Schaefer, "Inside Class Loaders", ONJava.com, O'Reilly Media, Inc. Nov. 12, 2003, 7 pgs.
Christudas, "Internals of Java Class Loading", ONJava.com, O'Reilly Media, Inc. Jan. 26, 2005, 15 pgs.
McManis, "Classic Tutorials for Java Beginners, The basics of Java class loaders", JavaWorld, Inc. Oct. 1, 1996, 7 pgs.
Paul, "What is the difference between a Class and an Object in Java?" java67.com, First Accessed on: Nov. 19, 2015, 4 pgs.
Bloom, "JVM Internals", blog.jamesdbloom.com, Nov. 24, 2013, 33 pgs.
Venners, "Classic Tutorials for Java Beginners, Object initialization in Java", JavaWorld, Inc. Mar. 1, 1998, 8 pgs.
Non-Final Office Action from U.S. Appl. No. 15/275,598, dated Apr. 6, 2018, 10 pp.
Non-Final Office Action from U.S. Appl. No. 15/275,616, dated Mar. 21, 2018, 21 pp.
Response to Non-Final Office Action dated Apr. 6, 2018, from U.S. Appl. No. 15/275,598, filed Jul. 3, 2018, 13 pp.
Response to Non-Final Office Action dated Mar. 21, 2018, from U.S. Appl. No. 15/275,616, filed Jun. 20, 2018, 18 pp.
International Preliminary Report on Patentability from International Application No. PCT/US2016/062771, dated May 31, 2018, 12 pp.

\* cited by examiner

DYNAMIC UPDATE OF AN APPLICATION IN COMPILATION AND DEPLOYMENT WITH HOT-SWAPPING

This application claims the benefit of U.S. Provisional Application No. 62/258,335, filed Nov. 20, 2015, the entire content of which is hereby incorporated by reference.

BACKGROUND

Software developers may write computer programs in human-readable source code that conforms to a particular syntax. By writing computer programs in human-readable source code, software developers may design and implement computer programs more efficiently than writing programs directly in machine readable code. To execute computer-programs that are initially written in human-readable source code, a compiler may transform the human-readable source code into machine-readable code, which may be interpreted by a virtual machine or executed directly by a particular computer processing unit (CPU) architecture. Each time a software developer changes human-readable source code in a computer program, to test or observe a change in functionality, the software developer must initiate a build process to re-compile the source code into machine-readable code. The build process may include compiling, packaging, deploying, and executing machine-readable code to observe or test the changed functionality. As the lines of code increase in a computer program, the build process may require greater amounts of time to complete. As such, a software developer that frequently executes the build process may experience increasing losses in productivity as the size of an application grows due to downtime that the developer incurs while waiting for the build process to complete.

DETAILED DESCRIPTION

Figure 1:
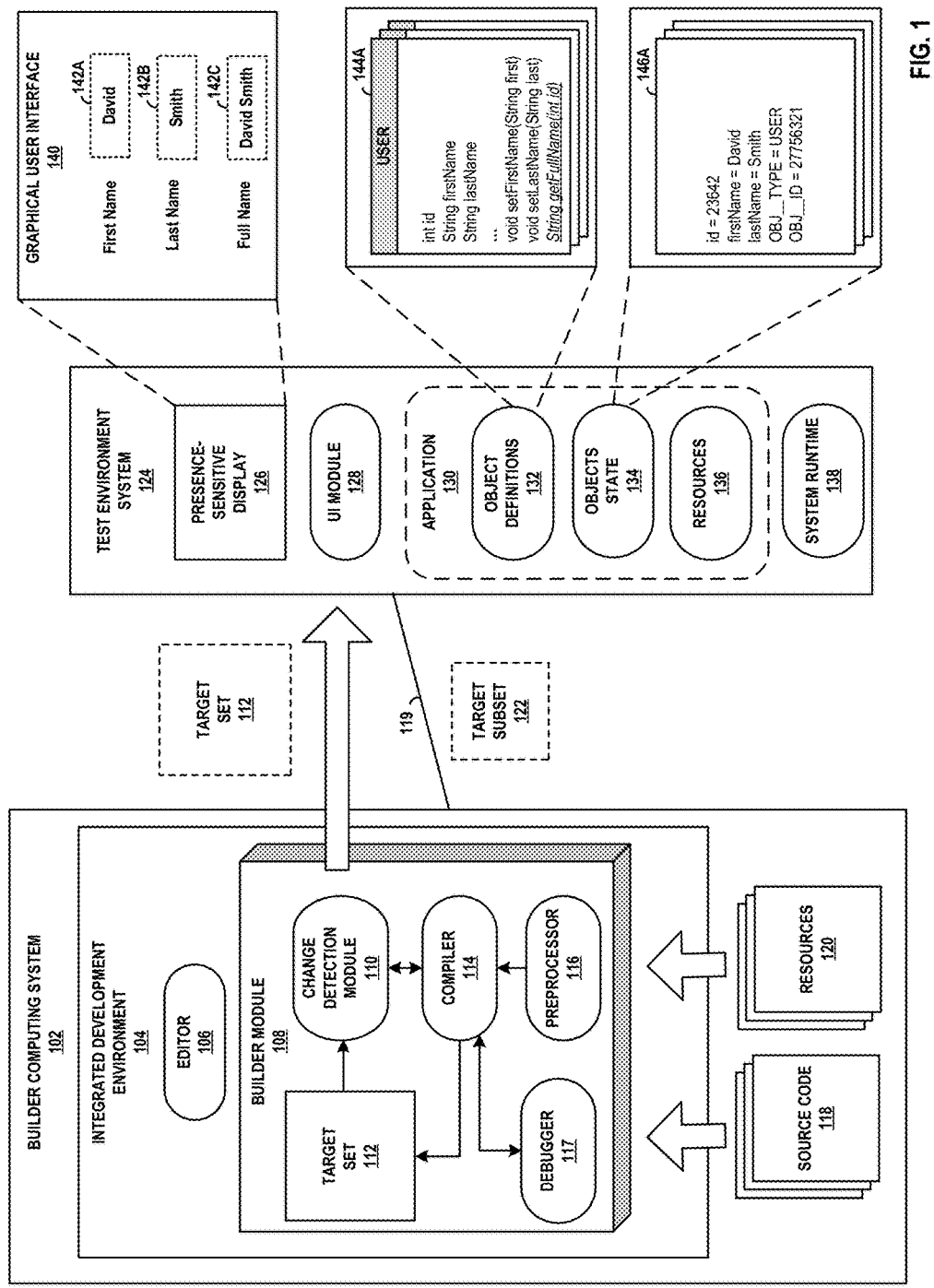
FIG. 1 is a conceptual diagram illustrating a builder computing system that may detect changes to a set of targets generated in a build process for an application and deploy a subset of the targets that have changed to the application executing at a test environment system, in accordance with techniques of the disclosure.

Techniques of the disclosure are generally directed to improving productivity of software developers by reducing the amount time needed to build and deploy incremental changes within an application. For instance, a builder computing system may initially generate an application package the represents an application. The application package may include machine-readable code (e.g., compiled targets) that is compiled from source code and may also include resources, such as images or any other uncompiled content. When a software developer initially builds the application package, the builder computing system compiles the source code, assembles the resources, packages both the resources and machine readable code into the application package, and sends the application package to a test environment system for execution. Rather than repeating this process each time the software developer makes a change to a subset of the source code and/or resources, techniques of the disclosure may, for incremental changes, send the subset of changed compiled and uncompiled targets to the test environment system. In this way, the more extensive and time-consuming process of building the entire application package each time may be avoided.

The techniques may also enable the application to execute updated machine readable code without terminating execution of application. For instance, when initially building the application package, the builder computing system may inject bytecode into an original compiled target that causes the original compiled target to check whether an updated version of the compiled target exists, and if so, execute program logic from the updated compiled target. When the original compiled target is loaded into memory of the test environment system and is executed, the program logic of the original compiled target is executed. However, if the software developer makes a change to source code for the compiled target, the builder computing system may generate the updated compiled target, which includes one or more indicators that the updated compiled target is a modified version of the original compiled target. The builder computing system may deploy the updated compiled target to the test environment system, and the test environment system may store a reference within the original compiled target to the updated compiled target. If program logic of the original compiled target is later executed, the original compiled target may determine that an updated version of the original compiled target exists, and invoke program logic of the updated compiled target. Because the application may be updated based on the changes without terminating execution of application, the application may retain its state during execution while exhibiting updates in its functionality from the updated compiled target. Additional techniques of this disclosure may update uncompiled targets such as resources and may also revert back to restarting the application if changes cannot be applied to an application without restarting.

FIG. 1 is a conceptual diagram illustrating a builder computing system 102 that may detect changes to a set of targets generated in a build process for an application and deploy a subset of the targets that have changed to the application executing at a user computing system 124, in accordance with techniques of the disclosure. In the example of FIG. 1, builder computing system 102 may be a desktop computer. However, in other examples, builder computing system 102 may be a tablet computer, a smartphone, a laptop computer, workstation, server, or another type of computing device. Builder computing system 102 may be a computing device used by a software developer to write computer programs comprised of source code, and compile the source code in an executable computer program. In some examples, builder computing system 102 may be a server that is accessed by a computing device of a software developer via a network to compile source code into a computer program. Although not shown in FIG. 1, builder computing system 102 may include applications and/or modules in addition to builder module 108. For instance, computing device 102 may include an operating system, web browser, command line terminal, or any other applications and/or modules that are executable by a computing device, to name only a few examples.

Builder computing system 102 may include an integrated development environment (IDE) 104. IDE 104 may be implemented as hardware, software, or a combination of hardware and software. In some examples, IDE 104 is a software application that includes a set of tools to design, debug, profile, and deploy applications, to name only a few examples. IDE 104, as shown in FIG. 1, includes an editor 106 and builder module 108. In some examples, one or more modules shown as included within builder module 108 may exist separately from builder module 108. In some examples, builder module 108 may include other components not shown in builder module 108, such as a profiling tool to measure application performance or a modeling tool to visually represent and design components to name only a few examples.

In some examples, editor 106 is a text editor. Text editor 106 may provide functionality for editing source code and other text. For instance text editor 106 may include syntax highlighting, code-completion, refactoring, and/or code-generation functionality to name only a few examples. Using text editor 106, a software developer may compose and edit source code 118 for an application 130. Application source code 118 may define controller logic, the model, and functionality of the presentation logic for application 130. In addition to source code 118, a software developer may also generate, assemble, or organize, application resources 120 that are included in application 130 or are used by builder module 108 to generate an application. Application resources 120 may include but are not limited to build scripts, source code or markup language that defines an appearance graphical user interface, and data files (e.g., text files, images, etc. included in the application).

Builder module 108 may receive one or more application resources 120 and source code 118, which builder module 108 may compile and/or assemble into one or more applications, such as application 130. Builder module 108 may include one or more sub-components to process and compile application resources 120 and application source code 118.

For instance, as shown in FIG. 1, builder module 108 may include a preprocessor 104 and a compiler 114. Preprocessor 116 may perform preliminary analysis and/or transformations on source code 118 and/or resources 120 prior to compilation at compiler 114. For instance, pre-processor 116 may parse and/or transform layout files that define a particular visual layout for a graphical user interface or perform preliminary checks for dependencies or syntax errors. In some examples, pre-processor 116 may orchestrate or coordinate the build process based on one or more build scripts.

Builder module 108 may also include a compiler 114. Compiler 114 may compile human-readable source code into machine-executable code. For instance, compiler 114 may perform lexical analysis of the human-readable source code. Lexical analysis may include dividing syntax elements of the source code into tokens. Each token may correspond to a symbol in a programming language, such as a keyboard, variable, or number. Compiler 114 may also perform syntax analysis on the tokens. For instance compiler 114 may generate a tree data structure, called a syntax or parse tree, which organizes the tokens based on the relationships between syntax elements that correspond to the tokens. Each node of the syntax tree may represent a token. As such, the syntax tree may represent the structure or organization of the computer program. Compiler 114 may also perform type checking on the syntax tree to determine if one or more programming language requirements are violated.

Compiler 114 may convert the human-readable source code in a syntax tree into machine-independent intermediate code, while in other examples, compiler 114 may convert the human-readable source code into assembly language for a specific machine architecture. For purposes of this disclosure, machine-executable code may refer to machine-independent intermediate code or assembly language for a specific computer architecture. The machine-independent intermediate code may be executed by a runtime environment or virtual machine that has been compiled for a specific computer architecture, while assembly language for a specific machine architecture is executed directly by a processor having a particular computer architecture.

As shown in FIG. 1, builder module 108 includes debugger 117. Debugger 117 provides debugging functionality, such as single-stepping and breaking through execution of application 130. In some examples, debugger 117 may provide for inspection of values assigned to variables in application 130 during execution, such that a software developer can view the values.

Compiler 114 may generate a target set 112 that includes one or more targets. A target may be compiled or uncompiled. In some examples, a target is a single file. For instance, a target may be a file that includes a set of machine-executable code (e.g., "compiled target") compiled from human-readable source code. A compiled target may be referred to as an object definition in object-oriented programming. In some examples, a target may have a particular name and may be a logical grouping of machine-executable code. For instance, in the Java programming language, a compiled target may be a compiled class file (e.g., object definition) with the same name as a source file that defines the logic of the compiled class file.

In some examples, a target may be an uncompiled target. An example of an uncompiled target may be a resource that is accessed, integrated, or otherwise used with an application. For instance an uncompiled target may be an image, layout definition, color definition, or the like. When building application 130, builder module 108 may assemble a target set 112 that includes compiled and uncompiled targets that collectively represent application 130. For instance, application 130 may be a collection of compiled targets and uncompiled targets that are bundled into a single file called an application package.

As shown in FIG. 1, during the software development process, a software developer may cause builder module 108 to compile source code 118 and assemble resources 120 into target set 112, which may be bundled by builder module 108 into an application package that represents application 130. Application 130 may be executed in test environment system 124 to observe or test functionality implemented in application 130. In FIG. 1, test environment system 124 is implemented as a separate computing device that is coupled to builder computing system 102 by a communication link 119. Examples of test environment system 124 may include, but are not limited to a tablet computer, a personal digital assistant (PDA), a laptop computer, server, desktop computer, a portable gaming device, a portable media player, an e-book reader, a smartwatch, television platform, or another type of computing device. Communication link 119 may be a wired or wireless link that operably couples builder computing system 102 to user computing system 124. Builder module 108 may deploy application 130 to test environment system 124 by sending a collection of compiled targets and uncompiled targets that represent application 130 to test environment system 124 via communication link 119. For instance, builder module 108 may deploy application 130 by sending an application package that represents application 130 to test environment 124.

As shown in FIG. 1, test environment 124 may include a presence-sensitive display 126. Presence-sensitive display 126 of test environment 124 may function as an input device and as an output device for test environment 124. In some examples, presence-sensitive display 126 may include an integrated presence-sensitive input device and a display device. For instance, presence-sensitive display 126 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Presence-sensitive display 126 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to the user of test environment 124.

Presence-sensitive display 126 may receive indications of the user input by detecting one or more tap and/or non-tap gestures, continuous gestures, or other any touch gestures (e.g., multi-touch gestures) received by test environment 124 (e.g., the user touching or pointing to one or more locations of presence-sensitive display 126 with a finger or a stylus pen). Based on indications of user input, a display device of presence-sensitive display 126 may present output to a user. For instance, a display device of presence-sensitive display 126 may present various user interfaces of applications executing at test environment 124. A user of test environment 124 may provide user input at a presence-sensitive input device of presence-sensitive display 126 to interact with one or more of these applications.

Test environment 124 may also include user interface (UI) module 128. UI module 128 of test environment 124 may receive from presence-sensitive display 126, one or more indications of user input detected at presence-sensitive display 126. Generally, each time presence-sensitive display 126 receives an indication of user input detected at a predefined location of presence-sensitive display 126, UI module 128 may receive information about the user input from presence-sensitive display 126. UI module 128 may assemble the information received from presence-sensitive display 126 into a set of events, which may be time-ordered, that are indicative of a gesture, such as a sequence of one or more touch events. Each touch event in the sequence may include data or components that represents parameters (e.g., when, where, originating direction) characterizing a presence and/or movement of input at the presence-sensitive screen. Each touch event in the sequence may include a location component corresponding to a location of presence-sensitive display 126, a time component related to when presence-sensitive display 126 detected user input at the location, and/or an action component related to whether the touch event corresponds to a lift up or a push down at the location. Moreover, one or more of the events may have a concurrent time component, and such events are described as touch events merely for purposes of example and may be indicative of a gesture at any form of presence-sensitive input device.

UI module 128 may determine one or more characteristics of the user input based on the sequence of touch events and include information about these one or more characteristics within each touch event in the sequence of touch events. For example, UI module 128 may determine a start location of the user input, an end location of the user input, a density of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, etc.). UI module 128 may transmit otherwise make available to application module 114 the sequence of touch events including the components or parameterized data associated with each touch event.

UI module 128 may act as an intermediary between various components of test environment system 124 to make determinations based on input detected by presence-sensitive display 126 and generate output presented by presence-sensitive display 126. For instance, UI module 128 may receive, as an input from application 130, a representation of graphical user interface 140 that includes input fields 142A-142C. UI module 128 may also receive a sequence of touch events generated from information about user input detected by presence-sensitive display 126. UI module 128 may determine, based on the location components in the sequence touch events that one or more location components approximate a selection of one or more locations of graphical user interface 140. UI module 128 may transmit, as output to application 130, the sequence of touch events. UI module 128 may also receive, information from application 130, which may be output for display at presence-sensitive display 126. UI module 128 may update graphical user interface 140, for example, to include data within input fields 142A-142C.

Although test environment system 124 is implemented as a computing device separate from builder computing system 102 in FIG. 1, in some examples, test environment system 124 may be implemented at builder computing system 102. For instance, test environment system 124 may be an emulator that emulates a device running particular operating system, such as described in FIG. 3. In such examples, test environment system 124 executes at builder computing system 102 as hardware, software, or a combination of hardware and software. In some examples, test environment system 124 may be implemented as a virtual machine at builder computing system 102. In some examples, test environment system 124 may be one or more directories in a file system of builder computing system 102 that include or otherwise store the file or files representing application 130.

In the example of FIG. 1, application 130, upon being built by builder module 106 is deployed to text environment system 124 for execution. For instance, builder module 108 may package target set 112 into a single file or set of files that builder module 108 sends to test environment system 124. Application 130 may include functionality to perform any of a variety of operations within test environment system 124. For instance, application 130 may be an email application, text messing application, instant messaging application, weather application, video conferencing application, social networking application, weather application, stock market application, emergency alert application, sports application, office productivity application, or multimedia player, to name only a few examples.

Test environment system 124, such as a computing device or emulator, may execute application 130. As shown in FIG. 1, application 130 may include but is not limited to object definitions 132, objects state 134 and resources 136. As described above, object definitions 132 may be compiled targets, such as compiled classes in an object-oriented programming language. When test environment system 124 executes application 130, test environment system 124 may load one or more of object definitions 132 into memory. For instance, instructions and/or symbols included in object definitions 132 may be loaded into random-access memory. As shown in FIG. 1, application 130 may include multiple object definitions. For example, object definition 144A illustrates human-readable contents of a compiled target for a class that is named USER. The USER class may define three variables: id (an integer), firstName (a string), and lastName (a string). Additionally, object definition 144A includes instructions that specify three functions or methods: setFirstName, setLastName, and getFullName. In some examples, a function may refer to a function, instance method class method, lamba, or any other suitable relation.

An application may create multiple object instances based on an object definition. For instance, application 130 may create multiple object instances based on object definition 144A during the lifecycle of application 130. When application 130 creates or instantiates an object instance 146A based on object definition 132, application 130 may invoke system runtime 138 by specifying the name of the object definition (e.g., "USER"). System runtime 138 may execute on or more system calls that reserve space in memory for the contents or "state" of each variable for the object instance defined based on object definition 144A. As shown in FIG. 1, object state 146A represents human-readable state of an object instance named Instance_1. Object state 146A includes values for the variables specified in object definition 144A. For instance, object state 146A includes values for each of variables id, firstName, and lastName. In addition object state 146A may include an OBJ_TYPE value that specifies the type of object definition of the object instance as well as a unique id of the object instance, such as randomly-generated hashcode. In some examples, a type of target may be a datatype of the target. In some examples, a type may be specific file extension of the target.

In operation, if program logic in application 130 executes the setFirstname method of object definition 144A using a reference or pointer to object instance 146, the instructions of setFirstName in object definition 132 are executed to write the value of 'first' to a location in memory that corresponds to firstName of object state 146A. In addition to object definitions 132 and objects state 134, application 130 may include resources 136 as described above. For instance, resources 136 may include images or any other resources that are used by application 130.

Each time that a software developer changes functionality in the source code of application 130, the software developer may provide a user input to initiate the build process at builder module 108. As the size of an applications grows, the amount of time needed to build and deploy an application for each iteration of testing or observing functionality may also grow. Because a software developer often does not modify every source file or logical component defined in source code when changing functionality of an application, re-compiling the source code for all targets, packaging the entire target set into a file representing the application, signing the file, and deploying the application may take lengthy periods of time for each build and deploy iteration. Since a software developer may modify an application many times in a single programming session, the amount of time per iteration to build and deploy the application, when measured cumulatively, may impact the software developer's overall productivity in a programming session. Moreover, as changes in functionality are implemented and deployed for testing and observation, an application that is previously running in the test environment needs to be restarted in order to execute the updated changes in functionality.

Techniques of this disclosure may reduce the amount of time to complete a build and deploy iteration when incremental changes to functionality are made in source code following an initial deployment of an application. For instance, builder module 108 may implement techniques to determine when the build process has incrementally generated a subset of updated compiled targets. Builder module 108 may send the subset of compiled targets to test environment system 124 without sending the entire target set 112 for application 130 to test environment system 124. In this way, builder module 108 may avoid unnecessary steps in the build process such as re-assembling an entire application package that includes the entire target set 112, sending the entire application package to test environment system 124, and re-launching application 130. Builder module 108 may further implement techniques that enable application 130 to update object definitions 132 that have changed without terminating execution of application 130. In this way, application 130 may retain its state while exhibiting the updates in its functionality. These and other techniques are further described herein with reference to FIG. 1.

Builder module 108 may implement techniques that enable application 130 to update object definitions 132 that have changed without terminating execution of application 130. In this way, application 130 may retain its state during execution while exhibiting updates in its functionality from a new build iteration. To enable application 130 to update object definitions 132 that have changed without terminating execution of application 130, builder module 108 may inject program logic into compiled targets during or after compilation. The additional program logic may include bolded lines 2-6 of the following pseudocode:

```
1   setFirstName(String first) {
2       Object $changeLocal = $change;
3       if ($changeLocal != null) {
4           return $changeLocal.access$dispatch(($changeLocal,
5               "setFirstName(String first)",first))
6       }
7       // methodName program logic
8       firstName = first;
9
10      // existing setFirstName program logic
11      ...
12  }
```

In the above example, the method setFirstName (String first) may be a method of a class (e.g., USER) defined in a source file. Initially, test environment system 124 may not include application 130, and builder computing system may not include target set 112. To compile application 130 for the first time, a software developer may provide a user input that causes builder module 108 to build and deploy application 130 in an initial build and deploy iteration. For purposes of this disclosure, when builder computing system initially builds target set 112, the target set 112 may not exist on test environment system 124. That is, a software developer may, during the initial build, cause builder computing system 102 to generate target set 112 for the first time. The software developer may, during the initial build, cause builder computing system 102 to package target set 112 in an application package and deploy the application package to test environment 124. During the initial build, test environment 124 may not have a previous version of the application package stored at test environment 124 or may have a previous version of the application package with a target set that is less recent than target set 112.

During the initial build, builder module 108 may add program logic in the form of bytecode to a compiled target, where the program logic performs the functionality of lines 2-6 of the pseudocode when setFirstName (String first) is invoked. Builder module 108, for instance, may add a $changeLocal variable to an object definition that is compiled from the USER class in the source file. The $changeLocal variable may be used to store a reference or memory location to another, but more recent version, of an object definition of the same type of USER class. The $changeLocal variable may be initialized to null, 0, or some other initialized value.

During the initial build and deploy iteration, builder module 108 may include additional program logic similar to lines 2-6 to each method of the USER class, such as setFirstName, setLastName, and getFullName. Builder module 108 may inject the additional program logic as bytecode at one or more locations of a compiled target that represents the USER class. In some examples, builder module 108 may determine the specific location relative to particular data within the file of the compiled target. The particular data may be data representing a compiled target name (e.g., a class name), a variable name, or a method name. As an example, builder module 108 may inject the program logic for lines 2-6 at a specific location that is prior to data in the compiled target that specifies the compiled target name. For instance, the builder module 108 may write the program logic for lines 2-6 in bytes prior to but adjacent to bytes in the compiled target that specify the compiled target name. Conversely, builder module 108 may inject the program logic for lines 2-6 at a specific location following data in the compiled target that specifies the compiled target name. In some examples, builder module 108 may inject the program logic for lines 2-6 at a specific location that is offset from particular data by an offset value.

Builder module 108 may inject program logic for lines 2-6 on a variety of levels of granularity with a compiled target. For instance, builder module 108 may inject program logic for lines 2-6 on a per-compiled target basis as described above. In some examples, builder module 108 may inject program logic for lines 2-6 on a per-method and/or per-variable basis. As an example, builder module 108 may inject a corresponding bytecode representing program logic for lines 2-6 for each method in a target. In some examples, when a new source file, class, method, or variable is created by a software developer, builder module 108 may inject program logic for lines 2-6 as bytecode into the corresponding compiled target that includes the definition for the corresponding class, method, or variable. Although techniques above have been described with respect to injecting bytecode into a compiled target after or during compilations, in some examples, program logic for lines 2-6 may be added by preprocessor 116 as human-readable source code to source files prior to compilation and then compiled to generate machine-readable code that represents program logic for lines 2-6.

Each compiled target, following injection of the bytecode with the additional program logic, is included in target set 112. Builder module 112 may then package compiled targets and uncompiled targets (e.g., resources) of target set 112 into an application package that builder module 108 may sign and send to test environment system 124. Upon receiving the application package which includes target set 112, test environment system 124 may execute the application package such that one or more object definitions 132 from target set 112 are loaded into memory.

At a later time, the software developer may change functionality in the method getFullName by altering the source code for getFullName. In some examples, changing the functionality of source code may include adding source code, deleting source code, renaming source code, rearranging source code, or any other modification to the source code. The software developer may provide another user input to IDE 104 that causes builder module 108 to re-compile the USER class. Builder module 106 may determine that an existing compiled target corresponding to the USER class is in target set 112. Accordingly, builder module 106 may include information in the updated compiled target that indicates the compiled target is changed from the existing compiled target. For instance, builder module 106 may modify the class name, method names, and/or variable names within the updated compiled target to distinguish the class name, method names, and/or variable names from the original compiled target. As an example, builder module 108 may change the class name included in the updated compiled target to USER$override. That is, builder module 108 may inject bytecode or otherwise modify the updated compiled target to add the suffix $override to the existing USER class name. In some examples, builder module 108 may inject bytecode or otherwise modify the updated compiled target to add an additional argument to each method signature of the USER class. In some examples, the additional argument is a reference to an instance of the compiled target that called method. For instance, builder module 108 may rewrite getFullName (Object obj, int id) in the updated compiled target.

In some examples, builder module 108 may rewrite instance methods and/or instance variables as class methods and/or class variables in an original or updated compiled target. In some examples, builder module 108 may change access modifiers (e.g., public, protected, private) from a more restrictive scope to a less restrictive scope. For instance, builder module 108 may change access modifiers of classes, methods, and/or variables from private to protected or protected to public. In some instances, the updated compiled target is injected with one or more instances of bytecode that represent the program logic of source code lines 2-6 above.

After builder module 108 has compiled a new version of the USER class into the updated compiled target, builder module 108 may determine which other resources and/or compiled targets have been updated. Because builder module 108 previously deployed the entire application package to test environment system 124, builder module 108 may refrain from performing unnecessary activities such as repackaging, signing, aligning, an entirely new application package, and instead determine a target subset 122 of only those resources and/or updated compiled targets that have changed. For instance, change detection module 110 may determine whether an updated compiled target that was generated by builder module 108 more recently than an existing version of a compiled target differs from the existing version. Change detection module 110 may select the updated compiled targets and resources that have changed as target subset 122. Builder module 108 may deploy or send target subset 122 to test environment system 124. In some examples, builder module 108 deploys or sends target subset 122 while refraining from deploying other compiled targets and/or resources in target set 122 that are not included in target subset 122. In this way, only the updated target subset 122 of resources and compiled targets is sent to test environment system 124.

Upon receiving target subset 122, system runtime 138 may load the updated compiled target for the USER class into memory while the previous version of the compiled target is already loaded in memory for execution of application 130. System runtime 138, when loading the updated compiled target into memory, may determine a memory location of or reference to the newer version of the updated compiled target, and store this memory location or reference in the $change variable of the previous or original version of the object definition. For instance, system runtime 138 may use reflection to identify and set the $change variable of the previous version of the object definition. In this way, if application 130 executes setFirstName (String first), the previous version of the compiled target initially executes its setFirstName (String first) method and determines that ($changeLocal !=null) is true because the $changeLocal variable is set to the memory location or reference to the updated version of the compiled target based on the $change variable. As a result, the previous version of the compiled target executes $changeLocal.access$dispatch ( ). The access$dispatch ( )method includes dispatcher program logic that accepts the arguments ($changeLocal, "setFirstName (String first)", first). The dispatcher program logic accesses the updated compiled target based on the reference included in $changeLocal. Upon accessing the updated compiled target, the dispatcher executes the method named "setFirstName (String first)", using the argument first. Because the dispatcher program logic can access the updated compiled target using the $changeLocal variable while application 130 is executing, changes in functionality to the updated compiled target may be tested and observed without terminating execution of application module 130. Since the execution of application module 130 has not been terminated, the objects state 134 for existing object instances may remain accessible in memory. As such, changes to the updated compiled target can be tested and observed using the existing objects state.

If the software developer changes the source code again or several times, the process above for sending an updated target set may be repeated. For instance, builder module 108 may send a subsequent updated compiled target with injected bytecode to test environment system 124. Test environment system 124 may set the $change variable for the corresponding, previous updated compiled target to point to or reference the subsequent updated compiled target that is loaded into memory. This process may be repeated each time incremental changes are built by builder module 108. The original compiled target that was previously loaded in memory of the test environment system, in some examples, may be dereferenced, removed from memory, and/or garbage collected. The techniques, as described above, may be referred to in some examples of this disclosure as "hot-swapping." Further techniques for "cold swapping" and "warm swapping" are also described in this disclosure.

Figure 2:
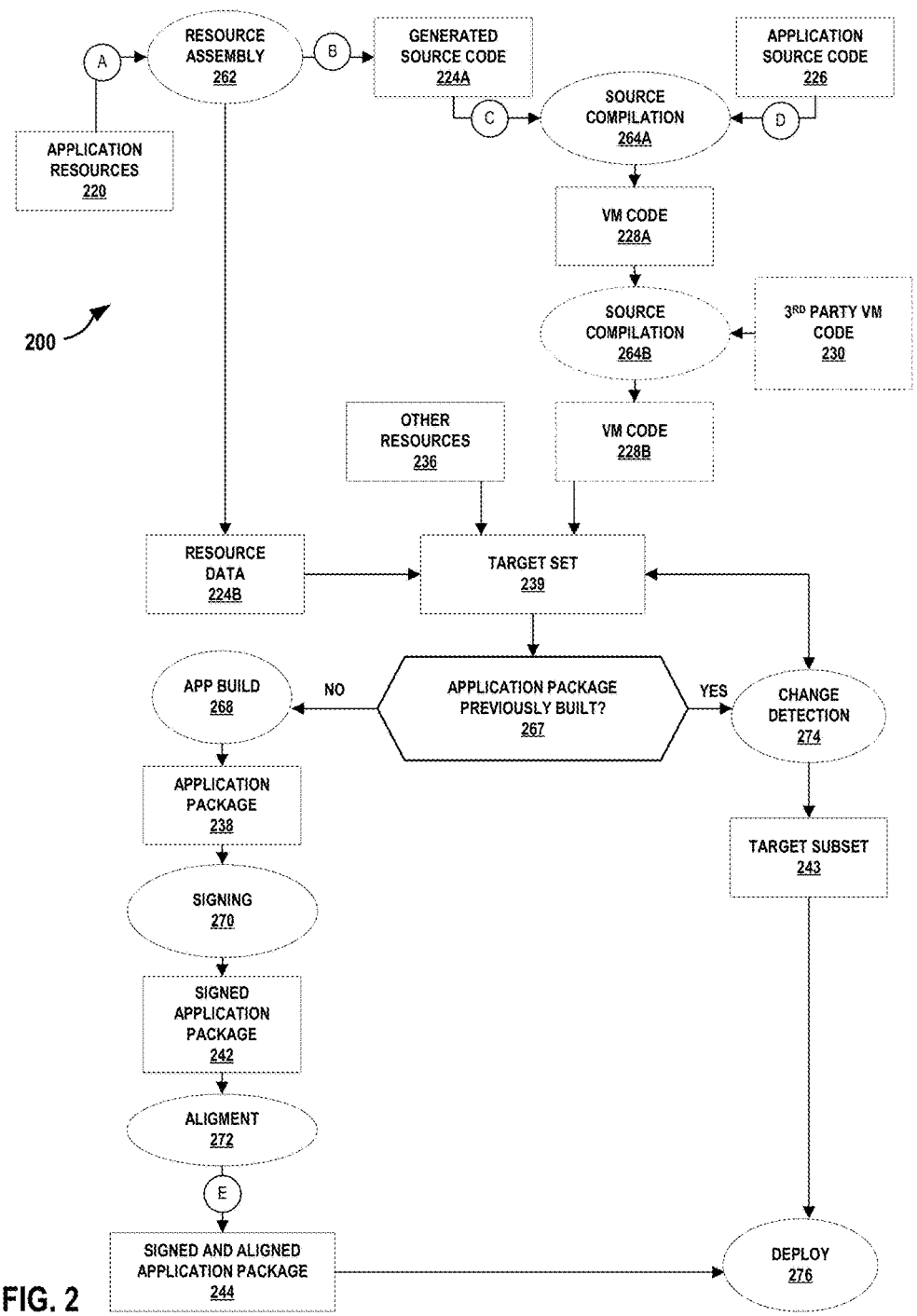
FIG. 2 is a flowchart illustrating software compilation and build process that may be performed by a builder computing system of FIG. 1, in accordance with one or more aspects of the present disclosure.

FIG. 2 is a flowchart illustrating software compilation and build process that may be performed by a builder computing system 102 of FIG. 1, in accordance with one or more aspects of the present disclosure. Process 200 is described in the context of builder module 108 of builder computing system 102 of FIG. 1.

Process 200 involves the manipulation and generation of intermediate files 220-244 through performance of one or more operations 262-276 for producing processor executable application program code. That is, intermediate files 220-244 represent the information (e.g., data) that builder module 108 of builder computing system 102 may generate at various stages of process 200 as builder module 108 performs one or more of operations 262-276 to generate code that is executable at a computing device, such as test environment 124 of FIG. 1. Process 200 is just one example software compilation and build process that builder module 108 may perform. In some examples, builder module 108 may generate additional or fewer intermediate files and/or perform additional or fewer operations than the intermediate files and operations shown in process 200. In some examples, builder module 108 may perform the operations of process 200 in a different order than that shown in FIG. 2 and described below.

Builder module 108 may perform resource assembly 262 on one or more application resources 220 to produce generated source code 224A and 224B (collectively "generated source code 224"). Application resources 220 may represent information that specifies the predefined features (e.g., declared features and permissions) of an application, such as the features of an application user interface (e.g., design layout, objects, colors, and other predefined features). In contrast to application resources 220, application source code 226 by definition represents the program logic within an application or target. For example, while application resources 220 may define the shape, color, or style of an object in a user interface of an application, application source code 226 may define the operations performed by a computing device when a user interacts with the object.

In some instances, application resources 220 may be defined in a mark-up language (e.g., extensible markup language [XML], etc.) and application resources 226 may be defined in a general-purpose or object-oriented programming language (e.g., Java, C, etc.). Builder module 108 may perform various resource assembly 262 tasks on application resources 220 in order to translate and specify the predefined features of the application in a similar general-purpose or object-oriented programming language that is used to define the logical features of the application that are specified by application source code 226. For example, an asset packaging tool of builder module 108 may assemble resources 220 and output generated source code 224 to specify the predefined features of the application in a language that is reconcilable, at compile time, with the logical features of the application defined by application source code 226.

Builder module 108 may perform source compilation 264A of generated source code 224A and application source code 226 to produce virtual machine (VM) code 228A. VM code 228A may be machine readable, executable code, that may be interpreted and executed by (e.g., a virtual machine module executing at) one or more processors of a computing device, such as test environment system 124. For example, in the Java programming language, .class files are examples of VM code 228A. Builder module 108 may perform source compilation 264A of generated source code 224A and application source code 226 by translating and reconciling the general-purpose or object-oriented programming language instructions associated with code 224A and 226 into VM code 228A that can later be interpreted and executed by a virtual machine.

In some examples, builder module 108 may perform source compilation 264B of VM code 228A to produce virtual machine (VM) code 228B that is different than VM code 228A. For instance, some computing platforms may exist as a customized adaptation of a pre-existing computing platform. While a pre-existing computing platform may be suitable for some applications, some mobile computing and/or wearable computing platforms may offer various enhancements in execution and performance that require different VM code and/or a completely different virtual machine executing on underlying hardware to execute the different VM code. Builder module 108 may perform source compilation 264B of VM code 228A to translate and redefine VM code 228A into machine readable, executable VM code 228B, that may be interpreted and executed by a different virtual machine module than the virtual machine module that can execute VM code 228A.

In some examples, builder module 108 may receive as input, any third party virtual machine code 230 that may need compiling when builder module 108 performs source compilation 264B of VM code 228A. For example, builder module 108 may compile VM code 228A into VM code 228B by further compiling any publicly available or other third party VM code 230 that a developer has instructed builder module 108 to include in the VM code 228B build stage.

As shown in FIG. 2, target set 239 may include VM code 228A and/or 228B, resource data 224B, and other resources 236. Other resources 236 generally represent any "non-compiled" resources (e.g., images, etc.) that were not compiled at resource assembly 262. Target set 239 may represent the contents of an application. In accordance with techniques of this disclosure, builder module 108 may determine at decision block 267 whether the application package that includes target set 239 was already initially generated. For instance, if builder module 108 has not previously generated the application package in a programming session of the software developer, builder module 108 may target set 239 to produce a single application package 238. In some examples, a programming session may be continuous period of time in which the software developer begins programming and later ceases programming to perform other activities without returning to programming during the continuous period of time.

In some examples, after builder module 108 builds application package 238, builder module 108 may perform additional operations deploying application package 238 for subsequent execution, such as at test environment system 124 of FIG. 1. For example, in some instances, builder module 108 may preform debug and/or release signing 270 of application package 238 to create signed application package 242. That is, before installation of the contents of application package 238, some computing environments may require the contents to have an identifier (e.g., a bit, a digital signature, a certificate, or some other marking) marking the author (e.g., the developer) of the contents as well as information specifying the contents as either being a debug or released version of the application. Builder module 108 may digitally sign the contents of application package 238 with an indication that the contents are either a debug or release version and output the marked contents as signed application package 242.

In some instances, builder module 108 may align 272 signed application package 242 to create signed and aligned application package 244 before uploading or otherwise releasing application package 244 for later execution by one or more computing devices, such as test environment 124 of FIG. 1. For example, builder module 108 may perform alignment 272 of signed application package 242 to ensure that all uncompressed data associated with package 242 begins with a particular (memory) alignment relative to the beginning of the file. For instance, by performing alignment 272, builder module 108 may causes all uncompressed data within package 242, such as images or other uncompressed files, to be aligned on two-byte, four-byte, or other byte-level boundaries. In this way, all portions of package 244 can subsequently be accessed directly with a memory call, even if some portions contain binary data with alignment restrictions. By aligning signed application packages 242, builder module 108 may enable a computing device to execute application package 244 using less memory. Upon generating signed and aligned application package 244, builder module 108 may deploy or send 276 package 244 to a computing environment such as test environment system 124.

Returning to decision block 267, if builder module 108 determines that an application package for target set 239 has been previously generated and deployed to a test environment system, builder module 108 may determine which compiled targets have changed within target set 239 as a result of incremental modifications to a subset of the source code and/or resources. For instance, builder module 108 may determine whether an updated compiled target that was generated by builder module 108 more recently than an existing version of a compiled target differs from the existing version. Change detection module 110 may select the updated compiled targets and resources that have changed as target subset 243. Builder module 108 may deploy or send 276 the target subset 234 to a computing environment, such as test environment system 124. In some examples, builder module 108 deploys or sends target subset 243 while refraining from deploying other compiled targets and/or resources in target set 239 that are not included in target subset 243. In this way, only the updated target subset 243 of resources and compiled targets is sent to test environment system 124.

Figure 3:
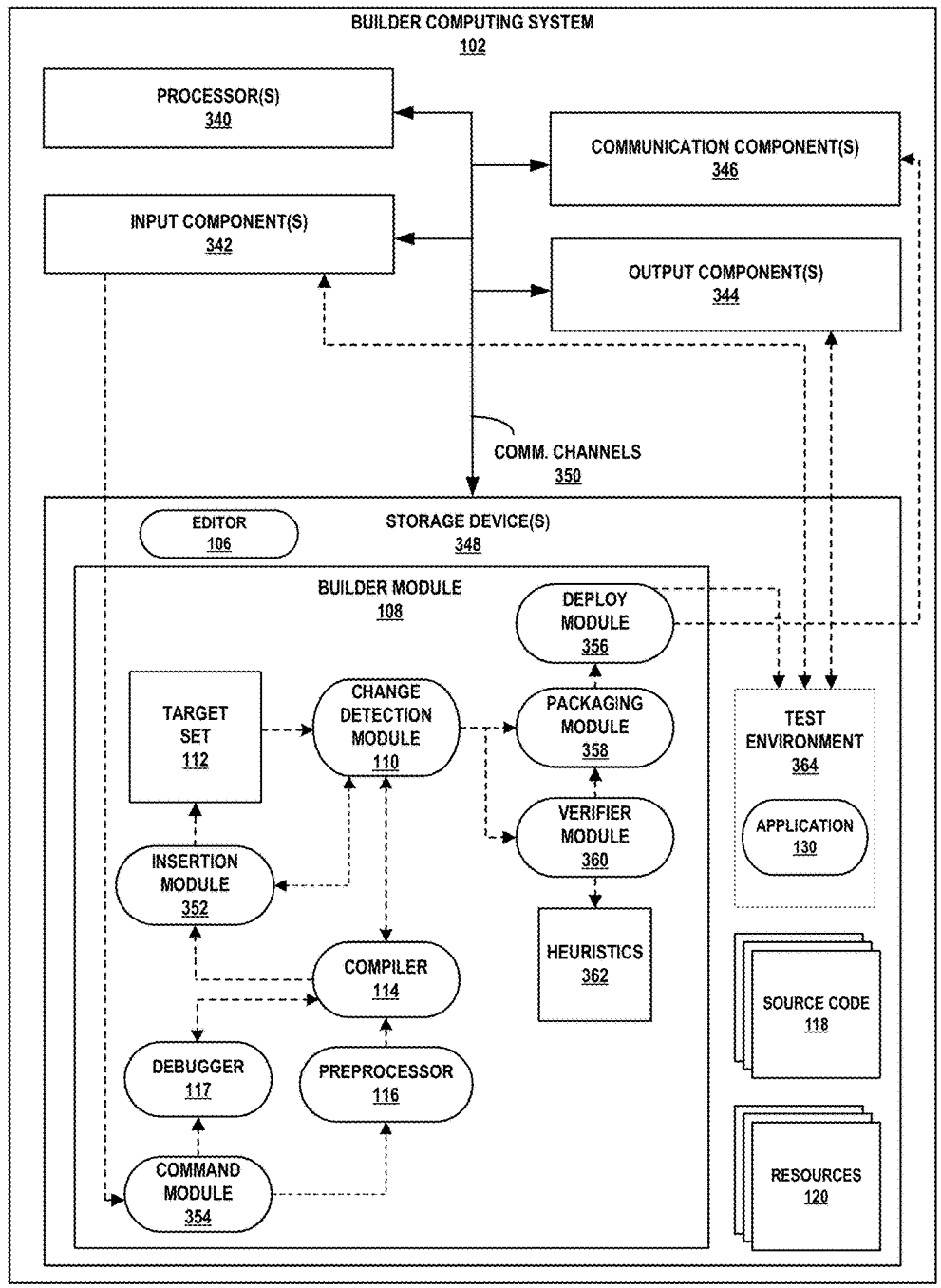
FIG. 3 is a block diagram illustrating a builder computing device as an example computing device configured to perform an example software compilation and build process, in accordance with one or more aspects of the present disclosure.

FIG. 3 is a block diagram illustrating builder computing device 102 as an example computing device configured to perform an example software compilation and build process, in accordance with one or more aspects of the present disclosure. FIG. 3 illustrates only one particular example of builder computing device 102 and other examples of builder computing device 102 may exist. Builder computing device 102 of FIG. 3 may include a subset of the components included in builder computing system 102 of FIG. 1 and may include additional components not shown in FIG. 3. Builder computing device 102 may perform process 200 of FIG. 2.

In the example of FIG. 3, builder computing device 102 may be a desktop computing device although in other examples, builder computing device 102 may be a laptop, tablet computing device, server computing device or any other computing device capable of performing techniques of this disclosure. Builder computing device 102 may be a software development device configured to compile code as part of a build process (e.g., process 200 of FIG. 2) for creating one or more executable software applications, such as an application package.

As shown in the example of FIG. 3, builder computing device 102 includes one or more processors 340, one or more input components 342, one or more output components 344, one or more communication components 346, and one or more storage components 348. Storage components 348 of builder computing device 102 includes builder module 108, target set 112, insertion module 352, debugger 117, command module 352, change detection module 110, compiler 114, preprocessor 116, deploy module 356, packaging module 358, verifier module 360, swap heuristics 362, test environment, 364, source code 118, editor 106, and resources 120.

Communication channels 350 may interconnect each of the components 340, 342, 344, 346, and 348 for inter-component communications (physically, communicatively, and/or operatively). In some examples, communication channels 350 may include a wired and/or wireless system bus, a wired and/or wireless network connection, an inter-process communication data structure, or any other method for communicating data between internal components of builder computing device 102.

One or more input components 342 of builder computing device 102 may receive input on behalf of the various other components and modules of builder computing device 102. For example, keyboard input from a user of device 102 at a text editor for writing application source code 326 and/or application resources 320. Examples of input are tactile, audio, and video input. Input components 342 of builder computing device 102, in one example, includes a presence-sensitive display, a touch-sensitive screen, a mouse, a keyboard, a voice responsive system, a video camera, a microphone or any other type of device for detecting input from a human or machine.

One or more output components 344 of builder computing device 102 may generate output for receipt by other computing devices, systems, and a user of device 102. For example, one or more output components 344 may present a user interface of a text editor and/or integrated development environment at a display of output components 344 from which a user of device 102 can view application source code 326 and/or application resources 320. Examples of output are tactile, audio, and video output. Output components 344 of builder computing device 102, in one example, includes a presence-sensitive display, sound card, video graphics adapter card, speaker, cathode ray tube (CRT) monitor, liquid crystal display (LCD), light emitting diode (LED) display, organic light emitting diode (OLED) display, or any other type of device for generating output to a human or machine.

One or more communication units 346 of builder computing device 102 may communicate with external devices via one or more wired and/or wireless networks by transmitting and/or receiving network signals on the one or more networks. Examples of communication unit 346 include a network interface card (e.g. such as an Ethernet card), an optical transceiver, a radio frequency transceiver, a GPS receiver, or any other type of device that can send and/or receive information. Other examples of communication units 346 may include short wave radios, cellular data radios, wireless network radios, as well as universal serial bus (USB) controllers.

One or more processors 340 may implement functionality and/or execute instructions within builder computing device 102. For example, processors 340 on builder computing device 102 may receive and execute instructions stored by storage components 348 that execute the functionality of modules 106, 108 (and corresponding data and modules of builder module 108), and test environment system 364. These instructions executed by processors 340 may cause builder computing device 102 to store information within storage components 348 during program execution. Processors 340 may execute instructions of modules 106, 108 (and corresponding data and modules of builder module 108), and test environment system 364 to cause modules 106, 108 (and corresponding data and modules of builder module 108), and test environment system 364 to perform techniques of this disclosure. That is, modules 106, 108 (and corresponding data and modules of builder module 108), and test environment system 364 may be operable by processors 340 to perform various actions or functions of builder computing device 102 in accordance with techniques of this disclosure.

One or more storage components 348 within builder computing device 102 may store information for processing during operation of builder computing device 102 (e.g., builder computing device 102 may store data accessed by 106, 108 (and corresponding data and modules of builder module 108), and test environment system 364 during execution. In some examples, storage component 348 is a temporary memory, meaning that a primary purpose of storage component 348 is not long-term storage. Storage components 348 on builder computing device 102 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 348, in some examples, also include one or more computer-readable storage media. Storage components 348 may be configured to store larger amounts of information than volatile memory. Storage components 348 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 348 may store program instructions and/or information (e.g., data) associated with modules 106, 108 (and corresponding data and modules of builder module 108), test environment system 364, source code 118, and resources 120.

Modules 106, 108 (and corresponding data and modules of builder module 108), and test environment system 364 may perform operations using software, hardware, firmware, or a mixture of hardware, software, and/or firmware residing in and executing on builder computing device 102. Builder computing device 102 may execute modules 106, 108 (and corresponding data and modules of builder module 108), and test environment system 364 with a single or multiple processors, such as processors 340. Builder computing device 102 may execute one or more of modules 106, 108 (and corresponding data and modules of builder module 108), and test environment system 364 as a virtual machine (VM) executing on underlying hardware components of builder computing device 102. In some examples, modules 106, 108 (and corresponding data and modules of builder module 108), and test environment system 364 may be arranged remotely to, and remotely accessible from, builder computing device 102, for instance, as one or more network services accessible by builder computing device 102 via a network cloud.

Builder module 108 is a more detailed example of builder module 108 of FIG. 1. Builder module 108 may perform the same, additional, or fewer operations than those performed by builder module 108 in FIG. 1. For example, builder module 108 may perform process 200 of FIG. 2, a subset of process 200, or additional operations beyond process 200.

The techniques of FIGS. 1 and 2 are further described with the previous example of FIG. 1. Source code 118, as shown in FIG. 2, may include a source file that includes source code defining a USER class as described in FIG. 1. The source file that defines the USER class may include three variables: id, firstName, and lastName. The USER class may also include three methods: setFirstName, setLastName, and getFullName. As an example, the method setFirstName (String first) may be a method of a class (e.g., USER) defined in the source file.

Initially, test environment system 124 may not include an application package for application 130 and builder computing system 102 may not include target set 112. To compile application 130 for the first time in a programming session, a software developer may provide a user input that causes builder module 108 to build and deploy application 130 in an initial build and deploy iteration. For instance, builder module 108 may include command module 354. Command module 354 may receive indications of user input from input components 342. For instance, if a user selects a visual icon in IDE 104 that corresponds to building and deploying an application, command module 354 may receive data that represents the user's selection to build and deploy the application. In other examples, if a user selects an icon in IDE 104 that corresponds to debugging an application, command module 354 may receive data that represents the user's selection to debug the application. In the example of FIG. 3, command module 354 receives data that represents the user's selection to build and deploy the application.

In response to receiving the indication of user input to build and deploy the application, command module 354 may send data to preprocessor 116 to perform any preprocessing operations on source code 118 and resources 120. Preprocessor 116 may determine a subset of source code files 118 and/or a subset of resources 120 that correspond to application 130 based, for example, on names of sources files and/or resources, or a project name or working set that specifies that source files and/or resources for application 130. Upon preprocessor 116 performing any preprocessing operations on source code 118 and resources 120, compiler 114 may compile source code from the sources files and any resources that may be compiled. For instance, compiler 114 may transform the human-readable source code for application 130 into machine-readable code, such as a set of compiled targets.

Builder module 108 may also include an insertion module 352. Upon compiler 114 generating the compiled targets, insertion module 352 may add program logic in the form of bytecode to compiled targets, where the program logic performs the functionality of lines 2-6 of the pseudocode described in FIG. 1. Insertion module 352, for instance, may add a $changeLocal variable to an object definition (e.g., compiled target) that is compiled from the USER class in the source file. Insertion module 352 may include the $changeLocal variable to store a reference or memory location to another, but more recent version, of an object definition of the same type of USER class later during execution in test environment system 364.

Insertion module 352 may include additional program logic similar to lines 2-6 as in the description of FIG. 1 to each method of the class USER, such as setFirstName, setLastName, and getFullName. Insertion module 112 may include each compiled target, following injection of the bytecode with the additional program logic, in target set 112. In some examples, change detection module 110 determines whether builder module 108 has previously generated an application package that represents application 130.

In accordance with techniques of this disclosure, if change detection module 110 determines that application 130 has not been previously built, then builder module 108 may generate an application package that represents application 130 and includes the contents of target set 112. Packaging module 112, for instance, may assemble compiled targets and uncompiled targets (e.g., resources) of target set 112 into an application package. In some examples, the application package may be compressed and/or may include one or more configuration files that indicate the contents and/or structure of the application package. In some examples, packaging module 358 may sign the application package with a key to indicate the authenticity of the package as being generated by a particular author. Deploy module 356 may deploy or otherwise send the application to test environment system 364. In some examples, deploy module 356 may include program logic to communicate with a server included in test environment system 364. For instance, deploy module 356 may create a socket to communicate with a server in test environment system 364. The server in test environment system 364 may receive an application package from builder computing system 102, and in some examples, initiate execution of the application package. The server in test environment system 364 may initiate execution of the application package in response to one or more commands sent by deploy module 356 to the server in test environment system 364.

In contrast to test environment system 124 of FIG. 1, test environment system 364 may be an emulator of a device implemented at builder computing system 102, rather than a standalone computing device. For instance, test environment system 364 may simulate a set of hardware (e.g., processors, input components, output components, and communication components) executing an operating system. Test environment system 364 may further include one or more system runtimes, such as system runtime 138 in FIGS. 1 and 4, which may provide one or more libraries, loaders, resource managers, servers, or other components to execute an application, such as application 130.

As described in FIG. 1, at a later time, the software developer may change functionality in the method getFullName by altering the source code for getFullName in a source file of source code 118. The software developer may provide another user input, received by command module 354, to rebuild application 130. Command module 354 may receive the user input and cause preprocessor 116 to perform any preprocessing on source code 118 and/or resources 120. Compiler 114 compiles the altered source code for getFullName. In some examples, compiler 114 may query change detection module 110 to determine which other sources files have been previously compiled. In this way, if compiler 114 determines that a source file has not changed and corresponding compiled target already exists for the source file, then compiler 114 may not re-compile the source file. In other examples, compiler 114 may compile re-compile all source files for application 130.

Upon compiler 114 compiling the source files, insertion module 352 may query change detection module 110 to determine whether an existing compiled target corresponding to the USER class is in target set 112. Insertion module 352, upon determining that a previous compiled target corresponding to the USER class exists, may insert or otherwise include information in the updated compiled target that indicates the compiled target is changed from the existing compiled target. For instance, insertion module 352 may modify the class name, method names, and/or variable names within the updated compiled target to distinguish the class name, method names, and/or variable names from an existing compiled target of the same type. As an example, insertion module 352 may change the class name included in the updated compiled target to USER$override. That is, insertion module 352 may inject bytecode or otherwise modify the updated compiled target to add the suffix $override to the existing USER class name. Although $override is used for illustrations purposes, any suitable prefix, suffix or substring may be prepended, inserted, or appended to existing names, such as class name, method name, and/or variable name. In some examples, insertion module 352 may inject bytecode or otherwise modify the updated compiled target to add an additional argument to each method signature of the USER class. As described in FIG. 1, the additional argument is a reference to an instance of the compiled target that called method. For instance, insertion module may rewrite getFullName (Object obj, int id) in the updated compiled target.

After compiler 114 has compiled a new version of the USER class into the updated compiled target, and insertion module 352 has added the additional program logic, change detection module 110 may determine which resources and/or compiled targets have been updated. Because builder module 108 previously deployed the entire application package for application 130 to test environment system 364, builder module 108 may refrain from performing unnecessary activities such as re-packaging, signing, aligning, an entirely new application package, and instead determine a target subset of only those resources and/or updated compiled targets that have changed. For instance, change detection module 110 may determine whether an updated compiled target that was generated by builder module 108 more recently than an existing version of a compiled target differs from the existing version. Change detection module 110 may select the updated compiled targets and resources that have changed as a target subset.

In some examples, packaging module 358, rather than generating a new application package with all of target set 112 that represents application 130, may instead send the target subset to test environment 354. In some examples, package module 358 may send individual changed compiled targets and/or resources to deploy module 356, which may in turn send the individual changed compiled targets and/or resources to test environment system 364. In other examples, packaging module 358 may group the changed compiled targets and/or resources of the target subset into a single file, which deploy module 356 may send to test environment system 364. As described in FIG. 1, builder module 108 may deploy or send the target subset while refraining from deploying other compiled targets and/or resources in the target set that are not included in target subset. In this way, only the updated target subset of resources and compiled targets may be sent to test environment system 124.

Upon receiving the target subset, test environment system 364 may load the updated compiled target for the USER class into memory while the previous version of the compiled target is already loaded in memory for execution of application 130. Test environment system 364, when loading the updated compiled target into memory, may determine a memory location of or reference to the newer version of the updated compiled target, and store this memory location or reference in the $change variable of the previous version of the object definition. For instance, test environment system 364 may use reflection to identify and set the $change variable of the previous version of the object definition. In this way, if application 130 executes setFirstName (String first), the previous version of the compiled target initially executes its setFirstName (String first) method and determines that ($changeLocal !=null) is true because the $changeLocal variable is set to the memory location or reference to the updated version of the compiled target based on the $change variable. As a result, the previous version of the compiled target executes $changeLocal.access$dispatch ( ). The access$dispatch ( )method includes dispatcher program logic that accepts the arguments ($changeLocal, "setFirstName (String first)", first). The dispatcher program logic accesses the updated compiled target based on the reference included in $changeLocal. Upon accessing the updated compiled target, the dispatcher executes the method named "setFirstName (String first)", using the argument first. Because the dispatcher program logic can access the updated compiled target using the $changeLocal variable while application 130 is executing, changes in functionality to the updated compiled target may be tested and observed without terminating execution of application module 130. Such techniques may be referred to as "hot-swapping." Since the execution of application module 130 has not been terminated, the objects state for existing object instances may remain accessible in memory. As such, changes to the updated compiled target can be tested and observed using the existing object instances.

In some examples, techniques of this disclosure may be applied to object-oriented programming languages such as Java in which a constructor of a subclass may call a super( ) method, which invokes a constructor of the parent class. In some examples, the parent class may include multiple constructors that each includes signatures that have different types and/or numbers of arguments. For instance, a parent class A may include a first constructor A(String s) and a second constructor A(int n).

If hot-swapping techniques were applied such that an original compiled target (e.g., subclass B) included call to A(String s) and was referenced by an updated compiled target (e.g., subclass B) that included a hard coded call to A(int n), then execution of the updated compiled target may fail using hot swapping as a result of a cast exception. As such, the application may revert to cold-swapping techniques to apply the updated call to A(int n), which may be slower than hot-swapping. To avoid reverting to cold swapping or failing altogether, insertion module 352 may inject bytecode for a new constructor represented by the following code of lines 2-11:

```
1    class B extends A {
2        private B(MarkerType _, String superSignature, Object
             args[ ]) {
3            switch( superSignature ) {
4                case "<init>.(Ljava/lang/String;)V":
5                    super((String)args[0]);
6                    break;
7                case "<init>.(I)V":
8                    super((int)args[1]);
9                    break;
10               default:
11                   throw new InstantReloadException( );
12       }
```

In line 2, insertion module 352 has generated a constructor signature that includes the argument MarkerType_which operates as a placeholder to avoid namespace collisions with existing constructor signature. The String superSignature indicates a string that identifies which particular super constructor will be called at runtime. The Object args [ ] argument includes the arguments that would be passed to the super constructor that will be called at runtime.

At line 3, a switch statement matches the string that identifies which particular super constructor will be called at runtime to a particular case of the switch statement. As shown in lines 4 and 7, the two possible strings in this example are "<init>. (Ljava/lang/String;) V" and "<init>. (I) V". The generation of these strings that identify which particular super constructor will be called at runtime are further described below in this example. The syntax of the "<init>. (Ljava/lang/String;) V" is as follows. The <init> string indicates that the "<init>. (Ljava/lang/String;) V" string represents a particular constructor. The Ljava/lang/String; string indicates that the argument to the constructor is of type string, and the v indicates that the return type of the method is void (e.g., because the constructor does not return any values). If superSignature includes a value of "<init>. (Ljava/lang/String;) V" then super constructor A(String s) will be executed at runtime by the updated compiled target. Alternatively, superSignature includes a value of "<init>. (I) V" then super constructor A(int n) will be executed at runtime by the updated compiled target, where (I) represents an integer argument of the super constructor for A(int n).

In addition to the code above, insertion module 352 may include bytecode in the existing constructor of class B (e.g., a subclass of class A) that is represented by the following code of lines 2 and 4-8:

```
1    B( ) {
2        if ($change == null) {
3            super(100);
4        } else {
5            String superSignature = change.access$dispatch(
6                "init$super_sig",new Object[ ] { $signature-
                 OfThis });
7            this((MarkerType)null, superSignature, locals);
8        }
9    }
```

As shown in line 2, insertion module 352 checks whether an updated version of the compiled target (e.g., class B) exists, and if not, the super constructor with the integer value 100 is executed, which causes parent class A to execute the constructor of class A that accepts an integer argument. If, however, an updated version of the compiled target (e.g., class B) exists, the code in lines 4-8, which was injected as bytecode by insertion module 352, is executed. Specifically, lines 5-6 generate a string—either "<init>. (Ljava/lang/String;) V" or "<init>. (I) V"—based on the "init$super_sig" which instructs the change.access$dispatch to return one of the two possible strings. The $signatureOfThis may indicate the type of super constructor of parent class A that will be called and for which change.access$dispatch will generate either the string "<init>. (Ljava/lang/String;) V" or "<init>. (I) V". The generated string is then used in line 7 to call the newly added constructor as described in lines 1-12 above to call the selected super constructor of parent class A. In this way, even if an updated version of the compiled target (e.g., class B) calls a different super constructor of A, the inserted bytecode representing source code lines 1-12 and 1-9 above enables the updated version of the compiled target (e.g., class B) to execute the appropriate super constructor of A using hot-swapping techniques of this disclosure rather than cold-swapping or failing altogether.

In some examples, structural changes implemented by a software developer to source code in application 130 may not allow application 130 to execute updated compiled targets in test environment system 364 without restarting application 130. For instance, application 130 may execute as one or more processes and/or threads in test environment system 124, and restarting application 130 may include terminating processes and threads of application 130 in test environment system 124. Restarting application 130 may include terminating all processes and threads of application 130 and subsequently initiating execution of application 130. Examples of such structural changes may include changing inheritance hierarchies in a hierarchy of classes in an object-oriented application, although many other examples are possible. More generally, structural changes that do not permit or allow application 130 to execute updated object definition 144B without restarting application 130 may include changes to source code that do not support byte-code injection or permit modification of compiled targets.

Figure 4:
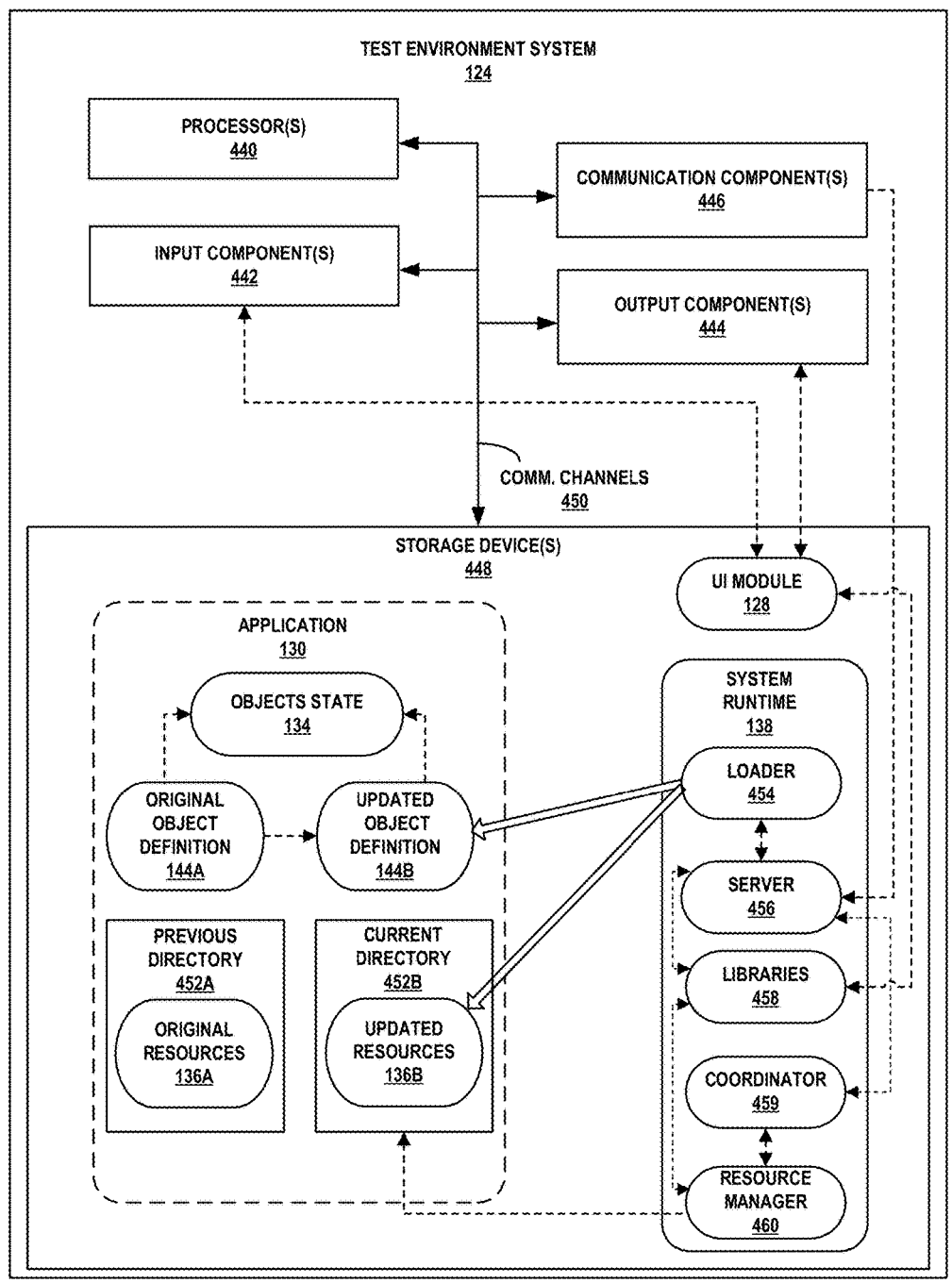
FIG. 4 is a block diagram illustrating a test environment system as an example computing device configured to execute an application, in accordance with one or more aspects of the present disclosure.

Builder module 108 may implement techniques to send a target subset of compiled and/or uncompiled targets that have changed to test environment system 364 and enable application 130 to restart and execute with the changed targets without re-packaging an entirely new application package and deploying the new application package to test environment system 364. Such techniques may be referred to as "cold-swapping." Compiler 114 and/or packaging module 358 may insert code or modify one or more compiled or uncompiled targets within the application package that represents application 130, such that application 130 is loaded into memory with newer compiled and uncompiled targets being loaded first in reverse chronological order. For instance, builder module 108 may include a customer classloader as the inserted code that loads newer compiled and uncompiled targets first in reverse chronological order, or the customer class loader may be included in system runtime 138, as shown in FIG. 4. If a more recent version of a compiled or uncompiled target has been loaded into memory, the older version may be not be loaded into memory, thereby ensuring that newer versions of compiled and uncompiled targets are loaded into memory.

To provide for cold-swapping, when application 130 is loaded by a loader (e.g., loader 454 in FIG. 4) in test environment system 364, the loader may search for and load newer compiled and uncompiled targets before older compiled and uncompiled targets. In some examples, compiled targets with machine executable code are stored in a predefined location or directory in a filesystem of test environment system 124 or 364. The predefined location or directory may be a relative or absolute directory. Compiler 114 and/or packaging module 358 may include data within the application package for application 130 that identifies the predefined location or directory.

To further describe cold-swapping techniques, builder module 108 may initially build an application package for application 130 that includes target set 112 as described in FIG. 3. Compiler 114 and/or packaging module 358 may insert code or modify one or more compiled or uncompiled targets within the application package that represents application 130, such that application 130 is loaded into memory with newer compiled and uncompiled targets being loaded first in reverse chronological order. Test environment system 364 may execute application 130 initially thereby loading one or more compiled and/or uncompiled targets into memory. Test environment system 364 may store the compiled targets with machine executable code in the predefined location or directory of test environment system 364 that is specified by the application package the represents application 130.

At a later time, a software developer may update source code for application 130 in such a way that does not allow application 130 to execute updated compiled targets in test environment system 364 without restarting application 130. Builder module 108 may compile the updated source code into one or more updated compiled targets of a hot-swap target subset as described above in FIG. 3, which include identifiers such as $override to indicate that the compiled targets have changed. Builder module 108 may also compile the updated source code into one or more updated compiled targets of a cold-swap target subset, which include compiled and uncompiled targets, based on the source code changes, that compiled according to the initial, rather than subsequent, compilation process as described above in FIG. 3.

In some examples, builder module 108 may send the hot-swap target subset and/or the cold-swap target subset to test environment system 364. Builder module 108 may send the hot-swap target subset and/or the cold-swap target subset while application 130 is executing. Text environment system 364 may store the hot-swap target subset and/or the cold-swap target subset targets in the predefined location or directory initially specified in application package representing application 130. In some examples, builder module 108 may send a command with the hot-swap target subset and/or the cold-swap target subset targets that is received by test environment system 364. Test environment system 364 may, based on the command (e.g., specifying a cold-swap operation), terminate one or more processes of application 130 and re-execute application 130.

Upon initiating re-execution of application 130, the loader for application 130 may identify cold-swap target subset of compiled targets included in the predefined location or directory initially specified in application package representing application 130. The loader may determine that an older version and newer version (e.g., from the cold-swap target subset) of a compiled target exist in the predefined location or directory. The loader may identify the newer version of the compiled target based on a date, timestamp, version number or other identifier that indicates the newer compiled target is more recent than the older compiled target. Based on this determination, the loader may load the newer compiled target first into memory. In this way, application 130 may execute using the newer compiled target that was loaded into memory.

As described above, cold-swapping may reduce the amount of time needed to perform a subsequent build and deploy iteration because the target subset of updated compiled targets, rather than an entirely new application package, is deployed at test environment system 364 in a subsequent iteration. Since application 130 includes data to identify the predefined location or directory for compiled targets that include machine-executable code and load such compiled targets in reverse chronological order, application 130 may be restarted with the newest compiled targets being loaded into memory for execution.

In some examples, builder module 108 may perform one or more patch compaction techniques. Each time builder module 108 detects edits to source files, compiles the changes into updated compiled targets, and then pushes updated compiled targets to the device, the test environment system may add a new patch file, comprising the updated compiled targets, into the predefined location or directory that is known to application 120. That is, each patch file may include a different set of updated compiled targets. At startup, application 130 will add all patches for application 130 to its loader (e.g., loader 454 in FIG. 4), in reverse order, such that the most recent compiled target is found by the loader first, and therefore loaded and used by application 130. However, for extended periods of iterative development, this may result in many patches, all being added to the test environment system. This may make subsequent executions of application 130 at test environment system 124 take longer and application 130 may run slower.

To avoid this, insertion module 352 and/or packaging module 358 may add runtime code to the application package representing application 130 that performs patch compaction. When a new patch (e.g., updated set of compiled targets) is received at test environment system 124, the patch compaction runtime code previously added to the application package will perform patch compaction. To illustrate, for each patch file, the patch compaction runtime code of application 130 stores an index of the compiled targets contained within the patch. The patch compaction runtime code can quickly traverse through a set of patch indices, in reverse order, and keep track of which compiled targets or classes are discoverable from a given patch by the loader (e.g., class loader) for application 130. In some examples, the indices may be stored in any suitable data structure such as a graph, map, list, or the like. In the most recent patch file, every class or compiled target of a specific type is available. In a prior patch, only classes or compiled targets of the specific type that are not also available in the later patch are accessible, and so on. Any patch that does not have any classes or compiled targets not present in later patches, may not be used by application 130, and can therefore be removed. As such, the patch compaction runtime code of application 130 may delete or otherwise remove any patch that does not have any classes or compiled targets not present in later patches. This may save space and improve performance when executing application 130. In practice this may beneficial because it may be typical for a user to make multiple edits to the same source file, over and over, and in such cases only the last patch needs to be preserved at test environment system 124.

As an additional performance improvement, in Java or other similar languages, there are often inner classes, which show up as separate classes even though they are in the same compilation unit. Edits to compilation units occur at the compilation unit level (the source file), rather than the individual classes, which may reduce the number of checks for class overlaps, but may also have the benefit that if the user removes an inner classes, a later patch will not see the removed inner class and consider that earlier patch relevant just because it contains an inner class reference that is not present in the later patch.

Builder module 108 may implement techniques to send a target subset of compiled and/or uncompiled targets that have changed to test environment system 364 and restart one or more threads of application 130 (without restarting application 130 completely, i.e., terminating all processes and subsequently initializing execution) in order to execute the changed compiled and/or uncompiled targets. Such techniques may be referred to as "warm-swapping."

In some examples, builder module 108 may determine that one or more of resources 120 may have changed during a build iteration. For instance, a software developer may have added or updated an image that is included in application 130. The image may be an uncompiled target because the image is not compiled by compiler 114 but is included in target set 112. Rather than re-compiling and re-packaging an application package for application 130 each time that one or more of resources 120 changes, builder module 108 may implement "warm-swapping" techniques in which application 130 may be updated with the one or more changed resources without restarting application 130 entirely.

As an example of warm-swapping, builder module 108 may initially build an application package that includes target set 112 which may include compiled and uncompiled targets, as previously described above. For instance, target set 112 may include an uncompiled resource, such as an image that is used by application 130. Builder module 108 may deploy the application package as described above when an application package is initially deployed in test environment system 364. The application package may include target set 112, which includes the compiled and uncompiled resources. Test environment system 364 may execute application 130 and load one or more compiled and uncompiled resources into memory, including the image. More particularly, as further shown in FIG. 4, a test environment, such as test environment system 124 may include a resource manager, such as resource manager 460. Resource manager 460 may be a module that provides one or more application programming interfaces to applications executing at test environment system 124. Applications may invoke the APIs directly or indirectly through libraries 458 to load uncompiled targets, such as an image for display or use in application 130. In some examples, a test environment may have a single resource manager instance per application or per test environment.

At a later time, a software developer may modify the image or replace the image with a different image of the same file name. The software developer may provide a user input that causes builder module 108 to build and deploy application 130. Change detection module 110 may determine that the original image has been modified and include the updated image as part of a target subset, which builder module 108 sends to test environment system 364. Test environment system 364 may receive the target subset.

In some examples of warm-swapping, resources are stored in a predefined location or directory in a filesystem of test environment system 124 or 364. The predefined location or directory may be a relative or absolute directory. The predefined location or directory for resources may be different than or the same as the predefined location or directory for compiled targets comprised of machine-readable code. In some examples, a predefined location may be hardcoded in a module or application by a software developer, or may be dynamically loaded from a configuration file into a variable of the module or application. As further illustrated and described in FIG. 4, a resource manager may load uncompiled targets such as resources from the predefined location or directory. The resource manager may load the resources based on data specifying the location or directory that is included in the resource manager or the application package. For instance, compiler 114 and/or packaging module 358 may include data within the application package for application 130 that identifies the predefined location or directory.

The resource manager may execute as a process or thread. In some examples, the resource manager may be a process that is forked from or a thread that is created by another process or thread of application 130. In other examples, the resource manager may be a system process or thread is initiated outside the execution of application 130, but which communicates with application 130 using one or more interprocess communication techniques. In any event, when test environment system 364 receives the target subset, a coordinator module stores the resources in the target subset in a temporary file or directory that is known the coordinator module. For instance, as further described in FIG. 4, the coordinator module (e.g., coordinator 459 in FIG. 4) may receive the resources from a server and store them in a temporary file or directory with a name that is different than the predefined location or directory that stores the resources and is known to the resource manager.

The coordinator may also receive a command to restart the resource manager without restarting application 130 entirely. Based on the command, the coordinator may swap the name of the predefined location or directory that stores the resources and is known to the resource manager and the name of the temporary file or directory that stores the updated resources. For instance, the coordinator may rename the predefined location or directory that stores the resources and is known to the resource manager to the name of the temporary file or directory that stores the updated resources, and vice versa. Based on the swapping of directory names, the coordinator may issue a signal or other instruction to the resource manager to restart the processor or thread that implements the resource manager. When the resource manager restarts, without terminating or restarting application 130 entirely, the resource manager opens the directory known to the resource manager, which now includes the updated resources. The newly-instantiated resource manager may reference the updated resources. In some examples, the coordinator may use reflection to identify each compiled target that is already loaded in memory and references the resource manager. The coordinator updates any such references to the newly-instantiated resource manager, which contains references to the updated resources. The coordinator may use reflection to update these references thereby avoiding the termination of application 130 entirely. In this way, application 130 may exhibit or otherwise display the updated resources without entirely restarting application 130.

In some examples, resource changes trigger code changes as well. For example, dragging in a button user interface element in a layout editor may only edit the layout .xml file, but it may set a new and unique "id" attribute on the button, such as @+id/button. Some resource systems (e.g., Android) may convert this into a special R.id.button field, and shift a number of unique ids on existing R fields. The positions of the R bits in a resource field that identifies/references a resource are tied to these new values, so builder module 102 may update all code references to R.type fields as well.

In some examples, an IDE that includes or communicates with builder module 108 may include a "run" icon that, when selected, causes builder module to initially build and deploy an application package, or if the icon is selected subsequent to builder module initially building and deploying the application package, then builder module 108 may perform hot-swapping and/or warm-swapping techniques. In some examples, the appearance of the run icon may change from a first visual appearance that indicates builder module will initially build and deploy and application package to a second, different visual appearance that the builder module will perform hot-swapping and/or warm-swapping techniques. The IDE may also include a "debugging" icon that operates and appears in a similar manner as described with respect to the "run" icon, but performs debugging operations for the initially deployed application or performs debugging using hot-swapping and/or warm-swapping.

In some examples, builder module 108 may include a verifier module 360 and heuristics 362. Verifier module 360 may determine whether changes to one or more compiled targets permit hot- or warm-swapping or necessitate using cold-swapping. Verifier module 360 may determine, based on data received from change detection module 110 and/or heuristics 362, whether hot- or warm-swapping may be used in test environment system 364 for the changes made in updated compiled targets.

Heuristics 362 may include data representing one or more conditions. Each condition may indicate whether hot- or warm-swapping can be used at test environment system 364. For instance, if changing inheritance hierarchies in a set of updated compiled targets would not permit hot-swapping, heuristics may include a condition to test for changed inheritance hierarchies in either the source code or bytecode of the updated compiled targets. If verifier module 360 determines that either the changed source code or bytecode of the updated compiled targets satisfies a condition in heuristics 362 that hot-swapping or warm-swapping cannot be used, then verifier module 360 may send data to packaging module 358, which causes packaging module 358 to insert data within a target set or target subset that hot-swapping or warm-swapping cannot be used. If verifier module 360 determines that either the changed source code or bytecode of the updated compiled targets satisfies a condition in heuristics 362 that hot-swapping or warm-swapping cannot be used, then verifier module 360 may send data to deploy module 356 to send a command that indicates hot-swapping or warm-swapping cannot be used and/or that cold-swapping should be used for the updated target set. Heuristics 362 may be configured by a software developer, hardcoded, or learned based on previous failures of hot-swapping or warm-swapping data received from test environment 364.

FIG. 4 is a block diagram illustrating test environment system 124 as an example computing device configured to execute application 130, in accordance with one or more aspects of the present disclosure. FIG. 4 illustrates only one particular example of test environment system 124 and other examples of test environment system 124 may exist. Test environment system 124 of FIG. 4 may include a subset of the components included in test environment system 124 of FIG. 1 and may include additional components not shown in FIG. 4.

In the example of FIG. 4, test environment system 124 may be a mobile computing device, such as a smartphone or tablet, although in other examples, test environment system 124 may be a desktop, laptop, server computing device, virtual machine, emulator, or any other computing device or simulator of a computing device capable of performing techniques of this disclosure. In examples where test environment system 124 is an emulator or virtual machine, hardware components described with respect to test environment 124 in FIG. 4 may be emulated in software with similar functionality described with respect to the hardware of FIG. 4. Test environment system 124 may be a user computing device configured to execute one or more application packages, modules or any other computer software.

As shown in the example of FIG. 4, test environment system 124 includes one or more processors 440, one or more input components 442, one or more output components 444, one or more communication components 446, and one or more storage components 448. Storage components 448 of test environment system 124 includes, but is not limited to: application 130, object state 134, original object definition 144A, updated object definition 144B, previous container 452A, original resources 136A, current container 452B, updated resources 136B, UI module 128, system runtime 138, loader 454, server 456, libraries 458, and resource manager 460.

Communication channels 450 may interconnect each of the components 440, 442, 444, 446, and 448 for inter-component communications (physically, communicatively, and/or operatively). In some examples, communication channels 450 may include a wired and/or wireless system bus, a wired and/or wireless network connection, an inter-process communication data structure, or any other method for communicating data between internal components of test environment system 124.

One or more input components 442 of test environment system 124 may receive input on behalf of the various other components and modules of test environment system 124. For example, input components 442 may receive touch input from a user of test environment system 124. Examples of input are tactile, audio, and video input. Input components 442 of test environment system 124, in one example, includes a presence-sensitive display, a touch-sensitive screen, a mouse, a keyboard, a voice responsive system, a video camera, a microphone or any other type of device for detecting input from a human or machine.

One or more output components 444 of builder test environment system 124 may generate output for receipt by other computing devices, systems, and a user of test environment system 124. For example, one or more output components 444 may present a user interface generated by application 130. Examples of output are tactile, audio, and visual output. Output components 444 of test environment system 124, in one example, includes a presence-sensitive display, sound card, video graphics adapter card, speaker, cathode ray tube (CRT) monitor, liquid crystal display (LCD), light emitting diode (LED) display, organic light emitting diode (OLED) display, or any other type of device for generating output to a human or machine.

One or more communication units 446 of builder test environment system 124 may communicate with external devices via one or more wired and/or wireless networks by transmitting and/or receiving network signals on the one or more networks. Examples of communication unit 446 include a network interface card (e.g. such as an Ethernet card), an optical transceiver, a radio frequency transceiver, a GPS receiver, or any other type of device that can send and/or receive information. Other examples of communication units 446 may include short wave radios, cellular data radios, wireless network radios, as well as universal serial bus (USB) controllers.

One or more processors 440 may implement functionality and/or execute instructions within test environment system 124. For example, processors 440 on test environment system 124 may receive and execute instructions stored by storage components 448 that execute the functionality of modules 130 (and corresponding data and modules of module 130), module 128 and module 138 (and corresponding data and modules of module 138). These instructions executed by processors 440 may cause test environment system 124 to store information within storage components 448 during program execution. Processors 440 may execute instructions of modules 130 (and corresponding data and modules of module 130), module 128 and module 138 (and corresponding data and modules of module 138) to cause modules 130 (and corresponding data and modules of module 130), module 128 and module 138 (and corresponding data and modules of module 138) to perform techniques of this disclosure. That is, modules 130 (and corresponding data and modules of module 130), module 128 and module 138 (and corresponding data and modules of module 138) may be operable by processors 440 to perform various actions or functions of test environment system 124 in accordance with techniques of this disclosure.

One or more storage components 448 within builder test environment system 124 may store information for processing during operation of test environment system 124 (e.g., test environment system 124 may store data accessed by modules 130 (and corresponding data and modules of module 130), module 128 and module 138 (and corresponding data and modules of module 138) during execution. In some examples, storage component 448 is a temporary memory, meaning that a primary purpose of storage component 448 is not long-term storage. Storage components 448 on test environment system 124 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 448, in some examples, also include one or more computer-readable storage media. Storage components 448 may be configured to store larger amounts of information than volatile memory. Storage components 448 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 448 may store program instructions and/or information (e.g., data) associated with modules 130 (and corresponding data and modules of module 130), module 128 and module 138 (and corresponding data and modules of module 138).

Modules 130 (and corresponding data and modules of module 130), module 128 and module 138 (and corresponding data and modules of module 138) may perform operations using software, hardware, firmware, or a mixture of hardware, software, and/or firmware residing in and executing on test environment system 124. Test environment system 124 may execute modules 130 (and corresponding data and modules of module 130), module 128 and module 138 (and corresponding data and modules of module 138) with a single or multiple processors, such as processors 440. Test environment system 124 may execute one or more of modules 130 (and corresponding data and modules of module 130), module 128 and module 138 (and corresponding data and modules of module 138) as a virtual machine (VM) executing on underlying hardware components of builder computing device 102 as shown in FIG. 3. In some examples, modules 130 (and corresponding data and modules of module 130), module 128 and module 138 (and corresponding data and modules of module 138) may be arranged as one or more network services accessible via a network cloud.

Test environment system 124 is a more detailed example of test environment system 124 of FIG. 1. Test environment system 124 may perform the same, additional, or fewer operations than those performed by test environment system 124 in FIG. 1. In accordance with techniques of the disclosure, test environment system 124 may initially receive an application package that represents application 130. For instance, deploy module 356 of FIG. 3 may establish a connection with server 456 of FIG. 4. As shown in FIG. 4, test environment system 124 may include system runtime 138. System runtime 138 may include loader 454, server 456, libraries 458, and resource manager 460. In some examples, system runtime 138 generally provides a set of services and libraries that an application, such as application 130 may use to execute at test environment system 124. For instance, server 456 may provide a service to receive application packages, target sets and subsets, or any other information from test environment system 124. Server 456 may implement one or more communication protocols, such as USB, HTTP, TCP/IP or any other suitable protocols for exchanging information with one or more other computing devices.

Server 456, upon receiving the application package for application 130 may invoke one or more functions of loader 454 to execute one or more compiled targets (e.g., object definitions) of application 130. For instance, server 456 may receive, in addition to the application package, one or more commands that server 456 may execute or forward to other components within test environment system 124. As an example, server 456 may receive a command with the application package to execute application 130. Accordingly, server 456 may send or use the command to cause loader 454 to execute one or more compiled targets of application 130.

In some examples, loader 454 loads a compiled target into memory. In some examples, loader 454 may represent multiple loaders, where each loader is responsible for loading a different compiled target into memory. Loader 454 may, for a particular compiled target, locate corresponding libraries 458 used by the compiled target and load any such libraries into memory, such that the libraries are accessible to the compiled target. In some examples, each application may have one or more loaders, which may be included in system runtime 138 or within the application itself. In the example of FIG. 4, loader 454 may initially load original object definition 144A into memory with corresponding libraries from libraries 458. Original object definition 144A may be a USER class compiled by compiler 114 that includes the additional program logic described in FIGS. 1-3, such as bolded lines 2-6 in the following pseudocode:

```
1    setFirstName (String first) {
2        Object $changeLocal = $change;
3        if ($changeLocal != null) {
4            return $changeLocal.access$dispatch(($changeLocal,
5                "setFirstName(String first)",first))
6        }
7        // methodName program logic
8        firstName = first;
9
10       // existing setFirstName program logic
11       ...
12   }
```

When application 130 is executed initially, the $change variable is null or otherwise uninitialized because no updated USER class has yet been compiled and deployed at test environment system 124. Application 130 may cause multiple instances of object definition 144A to be instantiated, where the state information for each instance of object definition 144A is stored as objects state 134. As such, the original object definition 144A may perform operations on state information for multiple, different instances of object definition 144A.

At a later time, while application 130 is executing in test environment system 124, a software developer may modify source code for the setFirstName (String first) method. As described in FIGS. 1-3, builder module 108 may determine that the source code for the setFirstName (String first) method has changed. Builder module 108 may inject byte-code or otherwise modify the updated compiled target to add the suffix $override to the existing USER class name to indicate that program logic within the USER class has changed, specifically, within setFirstName (String first). As described in FIGS. 1-3, deploy module 356 may send a subset of changed compiled targets and uncompiled targets as a target subset to test environment system 124 rather than sending the entire target set in an application package that represents application 130.

In FIG. 4, server 456 receives the target subset initially. Server 456 may also receive a command that instructs target environment system 124 to apply the updated compiled and uncompiled targets within application 130. Based on the command, server 456 sends the target subset to loader 454. Loader 454, based on the command, may identify a compiled target in the subset with a same name and/or type that matches the name of original object definition 144A. Loader 454 may load the compiled target, for instance, updated object definition 144B, into memory. Upon loading updated object definition 144B into memory, loader 454 may determine that original object definition 144A and updated object definition 144B have the same name and/or type. Based on this determination, loader 454 may determine a memory location or address of updated object definition 144B and set the $change variable of original object definition 144A to the memory location or address of updated object definition 144B.

At a later time after updating the $change variable of original object definition 144A to the memory location or address of updated object definition 144B, application 130 may invoke the setFirstName (String first) method of the USER class. When the setFirstName (String first) method of the USER class is invoked, test environment system 124 initially tests the condition if ($changeLocal !=null) to determine whether $changeLocal includes the memory address of an updated version of the USER class. Because loader 454 previously set the $change variable of original object definition 144A to the memory location or address of updated object definition 132, the condition resolves to true.

Accordingly, text environment system 124 executes the program logic $changeLocal.access$dispatch (($changeLocal, "setFirstName (String first)", first).

The access$dispatch ( ) method includes dispatcher program logic that accepts the arguments ($changeLocal, "setFirstName (String first)", first). The dispatcher program logic accesses updated object definition 144B based on the reference included in $changeLocal. Upon accessing updated object definition 144B, the dispatcher executes the method named "setFirstName (String first)", using the argument first. Updated object definition 144B includes updated program logic provided by the software developer to the setFirstName (String first) method, and therefore test environment system 124 executes the updated program logic. Because the dispatcher program logic can access the updated compiled target using the $changeLocal variable while application 130 is executing, changes in functionality to the updated compiled target may be tested and observed without terminating execution of application module 130. Since the execution of application module 130 has not been terminated, the objects state 134 for existing object instances may remain accessible in memory. As such, changes to the updated compiled target can be tested and observed using the existing objects state.

As described in FIG. 3, structural changes implemented by a software developer to source code in application 130 may not allow application 130 to execute updated compiled targets in a test environment system 124 without restarting application 130. Structural changes that do not permit or allow application 130 to execute updated object definition 144B without restarting application 130 may include changes to source code that do not support byte-code injection or permit modification of compiled targets. In such examples, test environment system 124 may implement one or more cold-swapping techniques.

In the example of FIG. 4, server 456 may initially receive an application package for application 130 from builder computing system 102. Compiler 114 and/or packaging module 358 of FIG. 3 may have modified one or more compiled or uncompiled targets or inserted code within the application package that represents application 130, such that application 130 is loaded into memory with newer compiled and uncompiled targets being loaded first in reverse chronological order. As an example, loader 454 may be a customer classloader that was previously included in the application package that loads newer compiled and uncompiled targets first in reverse chronological order. In some examples, if a more recent version of a compiled or uncompiled target has been loaded into memory, loader 454 may not load the older version into memory, thereby ensuring that newer versions of compiled and uncompiled targets are loaded into memory.

When application 130 is loaded by loader 454 in test environment system 124, loader 454 may search for and load newer compiled and uncompiled targets before older compiled and uncompiled targets. Compiled targets with machine executable code may be stored in a predefined location or directory in a filesystem of test environment system 124. The predefined location or directory may be a relative or absolute directory. As described in FIG. 3, compiler 114 and/or packaging module 358 may include data within the application package for application 130 that identifies the predefined location or directory.

At a later time, a software developer may update source code for application 130 in such a way that does not allow application 130 to execute updated compiled targets in test environment system 124 without restarting application 130. Builder module 108 of FIG. 3 may compile the updated source code into one or more updated compiled targets of a hot-swap target subset as described above in FIG. 3, which include identifiers such as $override to indicate that the compiled targets have changed. Builder module 108 of FIG. 3 may also compile the updated source code into one or more updated compiled targets of a cold-swap target subset, which include compiled and uncompiled targets, based on the source code changes, that compiled according to the initial, rather than subsequent, compilation process as described above in FIG. 3.

Server 456 may receive the hot-swap target subset and/or the cold-swap target subset from builder module 108, while application 130 is executing. Coordinator module 459 may receive the hot-swap target subset and/or the cold-swap target subset from server 456 and store the hot-swap target subset and/or the cold-swap target subset targets in the predefined location or directory initially specified in application package representing application 130. In some examples, data identifying the predefined location or directory may be hardcoded in coordinator 459 or determined by coordinator 459, or dynamically loaded from a configuration file into a variable of coordinator 459.

In some examples, server 456 may receive a command from builder computing system 102 with the hot-swap target subset and/or the cold-swap target subset targets. Test environment system 124 may, based on the command (e.g., specifying a cold-swap operation), terminate one or more processes of application 130 and re-execute application 130. Upon initiating re-execution of application 130, loader 454 may identify cold-swap target subset of compiled targets included in the predefined location or directory initially specified in application package representing application 130. Loader 454 may determine that an older version and newer version (e.g., from the cold-swap target subset) of a compiled target exist in the predefined location or directory. Loader 454 may identify the newer version of the compiled target based on a date, timestamp, version number or other identifier that indicates the newer compiled target is more recent than the older compiled target. Based on this determination, the loader may load the newer compiled target first into memory. In this way, application 130 may execute using the newer compiled target that was loaded into memory.

As described above, cold-swapping may reduce the amount of time needed to perform a subsequent build and deploy iteration because the target subset of updated compiled targets, rather than an entire application package, is deployed at test environment system 364 in a subsequent iteration. Since application 130, loader 454 and/or coordinator 459 includes data to identify the predefined location or directory for compiled targets that include machine-executable code and load such compiled targets in reverse chronological order, application 130 may be restarted with the newest compiled targets being loaded into memory for execution.

As described in FIG. 3, builder module 108 may implement techniques to send a target subset of compiled and/or uncompiled targets that have changed to test environment system 124 and restart one or more threads of application 130 (without restarting application 130 completely, i.e., terminating all processes and subsequently initializing execution) in order to execute the changed compiled and/or uncompiled targets. Such techniques may be referred to as "warm-swapping." As an example of warm-swapping, builder module 108 of FIG. 3 may initially build an application package that includes target set 112 which may include compiled and uncompiled targets. For instance, target set 112 may include an uncompiled resource, such as an image that is used by application 130. Server 456 may receive the application package from builder computing system 108 when the application package is initially deployed in test environment 142.

Loader 454 may load one or more compiled resources into memory, and resource manager 460 may load uncompiled targets and/or resources, including the image, into memory. As described in FIG. 3, resource manager 460 may be a module that provides one or more application programming interfaces to applications executing at test environment system 124 so that applications may use resources. Applications may invoke the APIs directly or indirectly through libraries 458 to load uncompiled targets, such as an image for display.

At a later time, a software developer may modify the image or replace the image with a different image of the same file name. The software developer may provide a user input that causes builder module 108 of FIG. 3 to build and deploy application 130. For instance, as described in FIG. 3, change detection module 110 may determine that the original image has been modified and include the updated image as part of a target subset, which builder module 108 sends to test environment system 124. Server 456 may receive the target subset.

Coordinator 459 may receive the target subset from server 456 and store the resources in a predefined location or directory in a filesystem of test environment system 124. The predefined location or directory 452B may be a relative or absolute directory. The predefined location or directory 452B for resources may be different than or the same as the predefined location or directory for compiled targets comprised of machine-readable code. Resource manager 460 may load uncompiled targets such as resources from the predefined location or directory. Resource manager 460 may load the resources based on data specifying the location or directory 460 that is included in the resource manager or the application package.

Resource manager 460 may execute as a process or thread. As described in FIG. 3, resource manager 460 may be a process that is forked from or a thread that is created by another processor or thread of application 130. In other examples, resource manager 460 may be a system process or thread is initiated outside the execution of application 130, but which communicates with application 130 using one or more interprocess communication techniques.

When server 456 receives the target subset, coordinator module 459 stores the resources, such as the updated image, in the target subset in a temporary file or directory. For instance, coordinator module 459 may receive the resources from a server and store them in a temporary file or directory with a name that is different than the predefined location or directory 452B that stores the resources and is known to resource manager 460. Coordinator 459 may also receive a command to restart the resource manager without restarting application 130 entirely. Based on the command, coordinator 459 may update the name of the temporary file or directory that stores the updated resources to the name of the predefined location or directory that stores the resources 452B and is known to resource manager 460.

As an example, prior the renaming operation, previous directory 452A may have the name of the predefined location or directory that is known to resource manager 460. Previous directory 452A may include original resources 136A, such as the original image for the application. Coordinator 459 may receive the updated image in a target subset and store the updated image in directory 452B, which includes updated resources 136B such as the updated image. Directory 452B may have a name other than name of the predefined location or directory that is known to resource manager 460. Coordinator module 459 may set the name of the temporary file or directory 452B that stores updated resources 136B to the name of the predefined location or directory 452A that stores original resources 136A. In this way, resource manager 460, if restarted, will load updated resources 136B from current directory 452B, which has the name of the predefined location or directory that is known to resource manager 460.

Based on the update of the name of current directory 452B, coordinator module 459 may issue a signal or other instruction to resource manager 460 to restart the process or thread that implements resource manager 460. When resource manager 460 restarts, without terminating or restarting application 130 entirely, resource manager 460 opens the directory 452B known to resource manager 460, which now includes the updated resources 136B. The newly-instantiated resource manager 460 may reference the updated resources 136B. In some examples, coordinator module 459 may use reflection to identify each compiled target (e.g., original object definition 144A and/or updated object definition 144B) in memory that references resource manager 460. Coordinator module 459 updates the reference to the newly-instantiated resource manager 460, which contains references to the updated resources 136B. Coordinator module 459 may use reflection to update these references thereby avoiding the termination of application 130 entirely. In this way, application 130 may exhibit or otherwise display the updated resources 136B without entirely restarting application 130.

As described in FIG. 3, builder module 108 may insert patch compaction program logic into application 130. The path compaction program logic, when executed in application 130, may determine that at least a first compiled target, and a second compiled target that is based at least in part on the first compiled target, are stored at the test environment system, such as in the directory or location that is known to application 130. For each compiled target, application 130 may generate a respective index indicates a respective version of the compiled target. In this way, a first version of a compiled USER class may have a first index representing the first version, and a second version of a compiled USER class may have a second index representing the second version. Application 130, when executing the patch compaction program logic, may determine that the first version of the compiled USER class is more recent than a second version of the compiled USER class, wherein the first version is indicated by the first index and the second version is indicated by the second index. Application 130 may delete, based at least in part on first version being more recent than the second version, the second, less recent version of the compiled USER class. In some examples, if there are additional less recent versions of the compiled USER class, then application 130 may delete such less versions as well.

As described in FIG. 3, in some instances, hot- or warm-swapping may not be possible due to structural changes in the source code that are incorporate into updated compiled targets. In such examples, performing hot- or warm-swapping may fail at test environment system 124. Rather than allowing application 130 to crash in an unexpected or unhandled way, application coordinator 459 may revert from hot- or warm-swapping to cold swapping. For instance, if test environment 124 receives a command to perform a hot- or warm-swap operation and application 130 throws or otherwise raises an unhandled error or exception, coordinator 459 may catch or receive the exception or error and cause updated compiled targets to be applied to application 130 using cold-swapping. As described in FIG. 3, in some examples, builder computing system may send a hot-swap target subset and/or a cold-swap target subset of compiled targets to test environment system 124. In this way, if coordinator 459 determines that applying the hot-swap target subset has failed, coordinator 459 can apply the cold-swap target subset.

Figure 5:
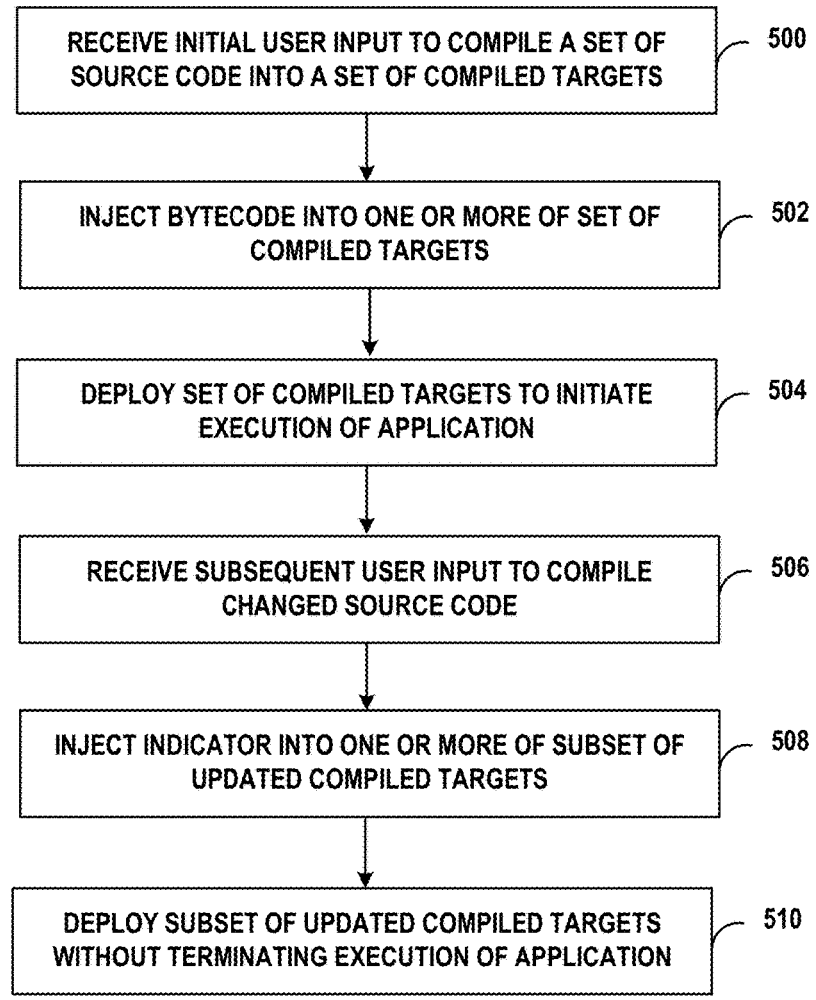
FIG. 5 is a flow diagram illustrating example operations of a builder computing system configured to perform hot-swapping techniques, in accordance with techniques of this disclosure.

FIG. 5 is a flow diagram illustrating example operations of a builder computing system configured to perform hot-swapping techniques, in accordance with techniques of this disclosure. For purposes of illustration only, the example operations are described below within the context of builder computing system 102 of FIGS. 1 and 3.

Builder computing system 102 may receive an initial user input that causes builder computing system 102 to compile a set of source code for application 130 into a set of compiled targets (500). For instance, software developer may select an icon or input a command that causes builder computing system 102 to initially compiles source code for application 130 into a set of compiled targets. Upon compiling the source code, builder computing system 102 may inject bytecode, as described in FIGS. 1-4, into a compiled target (502). The bytecode may include a conditional statement indicates whether an updated version of the compiled target is loaded in memory of the test environment.

Builder computing system 102 may package the set of compiled targets, one or more of which include the injected bytecode, in application package. Builder computing system 102 may perform one or more additional operations on the application package, such as signing, compressing, aligning or any other operations. Builder computing system 102 may deploy the set of compiled targets as an application package that is sent by builder computing system 102 to a test environment system (504). In some examples, deploying the set of compiled targets may include sending a command that causes the test environment to install the application package.

Builder computing system 102 may receive a subsequent user input to that modifies a subset of the source code. Following the modifies made by the user, the user may provide a user input that causes builder computing system 102 to compile at least a subset of the source code into an updated subset compiled targets (506). Builder computing system 102 may inject an indicator, such as a string or other bytecode, into an updated compiled target (508). The indicator may indicate that the updated compiled target is changed in relation to an original compiled target that corresponds to the updated compiled target (e.g., based on being of the same type as the original compiled target). Builder computing system 102 may deploy the updated subset of compiled targets to update application 130 based on the updated subset without terminating execution of application 130 (510). For instance, builder computing system 102 may send the updated subset to the test environment. In some examples, builder computing system 102 may send a command that causes the test environment to update application 130 without restarting application 130.

Figure 6:
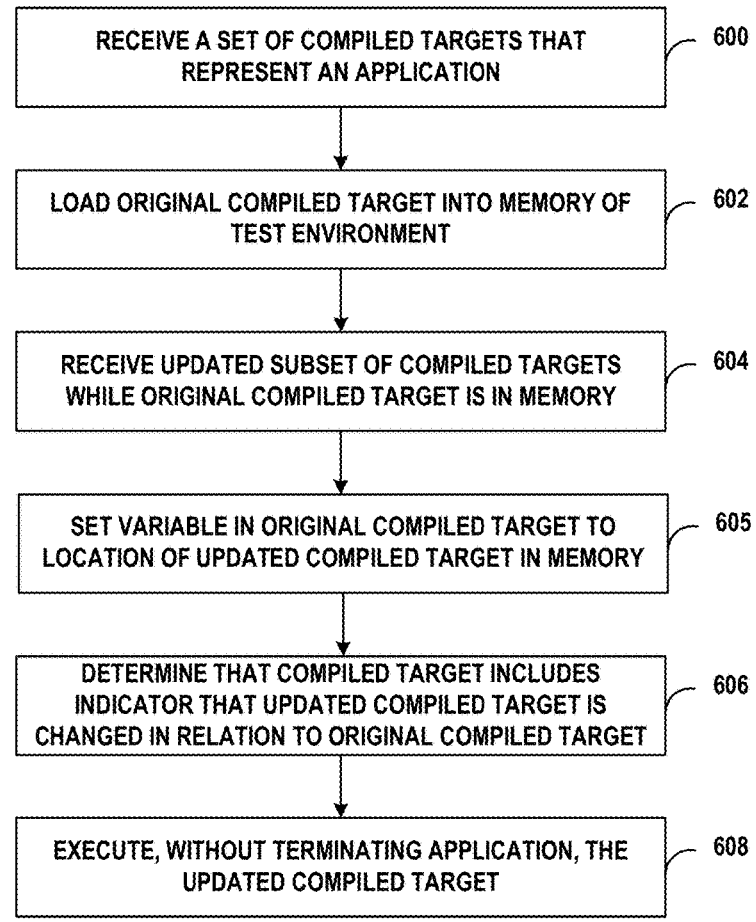
FIG. 6 is a flow diagram illustrating example operations of a test environment system configured to perform hot-swapping techniques, in accordance with techniques of this disclosure.

FIG. 6 is a flow diagram illustrating example operations of a test environment system configured to perform hot-swapping techniques, in accordance with techniques of this disclosure. For purposes of illustration only, the example operations are described below within the context of test environment system 124 of FIG. 4.

Test environment system 124 may initially receive a set of compiled targets from builder computing system 102 (600). For instance, builder computing system 102 may compile a set of source code into compiled target, assemble other uncompiled targets, and package the compiled and uncompiled targets into an application package. Builder computing system 102 may send this application package to test environment system 124. Builder computing system 102 may load an original compiled target of the set of compiled targets into memory of the test environment system (602). In the example of FIG. 6, the original compiled target may include a conditional statement indicates whether an updated version of the compiled target is loaded in memory of the test environment.

Test environment system 124 may receive an updated subset of compiled targets while the original compiled target is stored in memory (604). For instance, a software developer may have modified source code for the original compiled target and builder computing system 102 may have recompiled the modified source into an updated compiled target. The updated compiled target may include an indicator that indicates the updated compiled target is changed in relation to the original compiled target. Test environment system 124 may set a variable in the original compiled target to the location of the updated compiled target in the memory of the test environment system (605).

Test environment system 124 may determine that the compiled target includes an indicator that indicates the updated compiled target is changed in relation to the original compiled target (606). For instance, application 130 may invoke a function or method of the original compiled target. The conditional statement that indicates whether an updated version of the compiled target is loaded in memory of the test environment may resolve to true because the conditional statement includes the variable that is now set to the location of the updated compiled target. In response to determining that the updated compiled target is changed in relation to the original version of the compiled target, the test environment may execute, without terminating execution of application 130, the updated compiled target in response to an invocation of program logic, such as the method or function, in the original compiled target (608).

Figure 7:
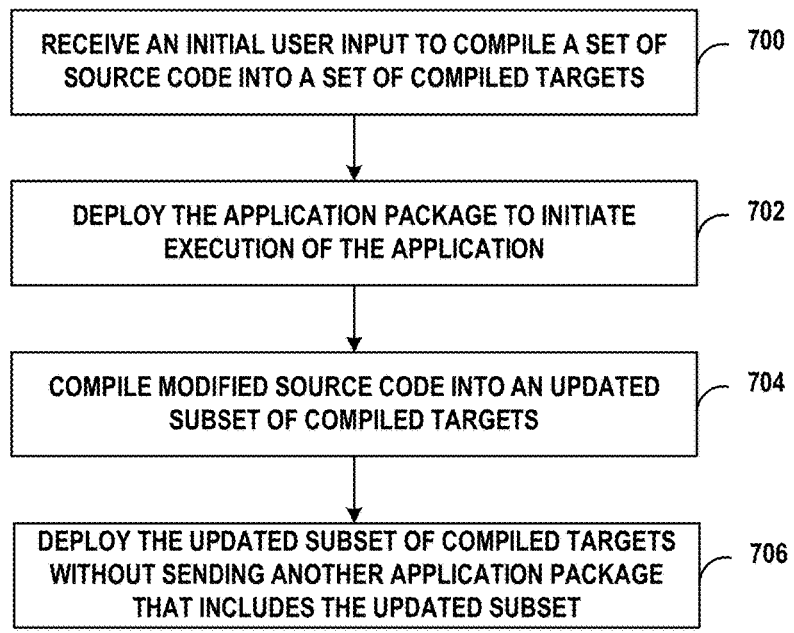
FIG. 7 is a flow diagram illustrating example operations of a builder computing system configured to perform cold-swapping techniques, in accordance with techniques of this disclosure.

FIG. 7 is a flow diagram illustrating example operations of a builder computing system configured to perform cold-swapping techniques, in accordance with techniques of this disclosure. For purposes of illustration only, the example operations are described below within the context of builder computing system 102 of FIGS. 1 and 3.

Builder computing system 102 may receive an initial user input that causes builder computing system 102 to compile a set of source code into a set of compiled targets of an application package that implements an application 130 (700). Builder computing system 102, for instance, may compile the source code into the compiled targets, assemble other uncompiled targets, and package the compiled and uncompiled targets into an application package. Builder computing system 102 may deploy the application package by sending the application package to a test environment, which executes the contents of the application package (702).

A software developer may later edit a subset of the source code. The software developer may provide a user input that causes builder computing system 102 to compile at least the subset of the set of source code into an updated subset of compiled targets (704). Rather than re-compiling all the source code into compiled targets, assembling all the other uncompiled targets, and packaging the compiled and uncompiled targets into an application package, builder computing system may deploy the updated subset of compiled targets to the test environment without sending another application package that includes the updated subset of compiled targets (706). In this way, additional processing steps for generating, sending, and installing another application package may be avoided by only sending the updated subset of compiled targets to the test environment.

Figure 8:
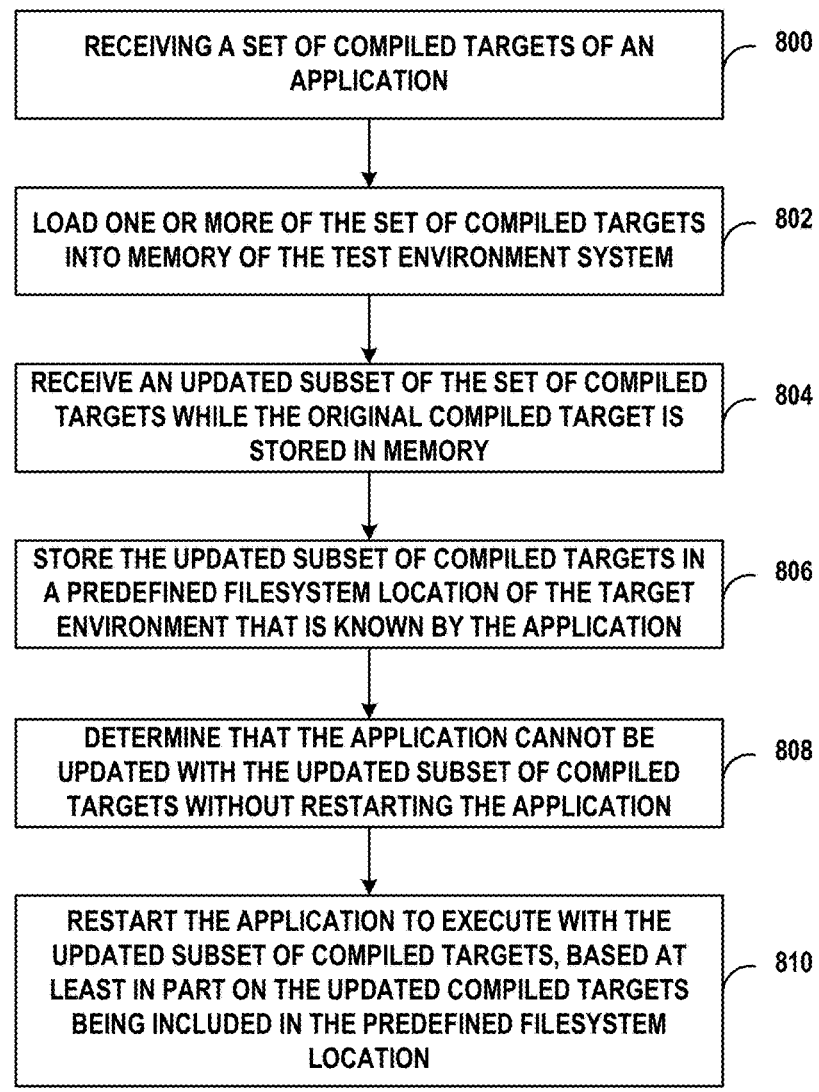
FIG. 8 is a flow diagram illustrating example operations of a test environment system configured to perform cold-swapping techniques, in accordance with techniques of this disclosure.

FIG. 8 is a flow diagram illustrating example operations of a test environment system configured to perform cold-swapping techniques, in accordance with techniques of this disclosure. For purposes of illustration only, the example operations are described below within the context of test environment system 124 of FIG. 4.

In FIG. 8, test environment system 124 may receive a set of compiled targets of application 130 (800). For instance, builder computing system 102 may have generated the set of compiled target in response to receiving a user input. In some examples, builder computing system 102 packages the set of compiled targets into an application package that represents application 130. The application package may include compiled and uncompiled targets. Test environment system 124 may load one or more of the set of compiled targets into memory of the test environment system, such that application 130 is executing (802).

Test environment system 124 may later receive an updated subset of the set of compiled targets while the original compiled target is stored in memory (804). For instance, a software developer may modify source code of application 130 and provide a user input that causes builder computing system 102 to compile the modified source code into an updated set of compiled targets. Builder computing system 102 may send the updated set of compiled targets to test environment system 124.

Test environment system 124, upon receiving the updated set of compiled targets may store the updated subset of compiled targets in a predefined filesystem location of the target environment that is known by application 130 (806). For instance, application 130 may include data that identifies an absolute or relative directory that represents the predefined filesystem location. Application 130 may determine that it cannot be updated with the updated subset of compiled targets unless application 130 is restarted. Accordingly, test environment system 124 may cause application 130 to restart. That is, test environment system 124 may restart the application to execute with the updated subset of compiled targets, based at least in part on the updated compiled targets being included in the predefined filesystem location of the target environment (810). For instance, test environment system 124, because it accesses the predefined filesystem location of the target environment that is known by application 130, may execute the updated subset of compiled targets included in the predefined filesystem location.

Figure 9:
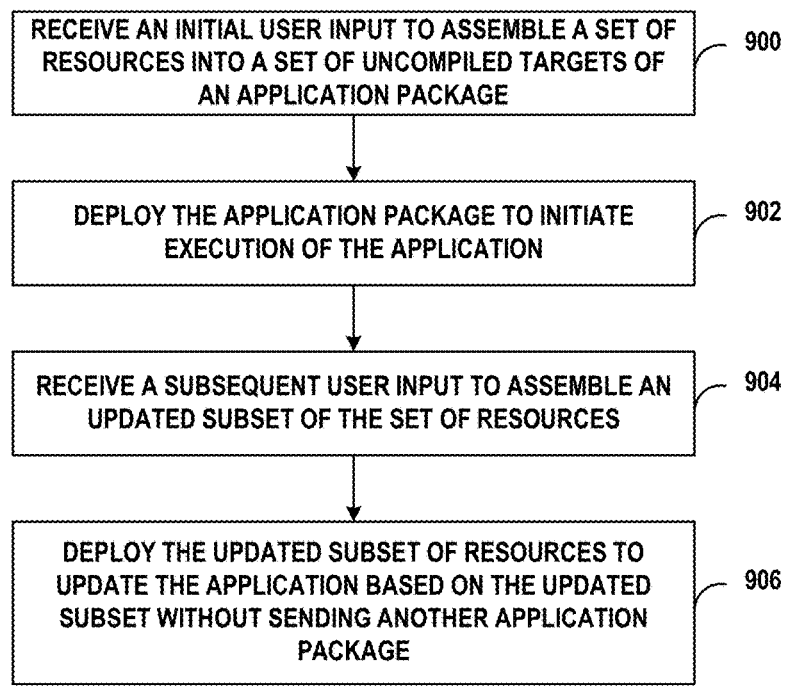
FIG. 9 is a flow diagram illustrating example operations of a builder computing system configured to perform warm-swapping techniques, in accordance with techniques of this disclosure.

FIG. 9 is a flow diagram illustrating example operations of a builder computing system configured to perform warm-swapping techniques, in accordance with techniques of this disclosure. For purposes of illustration only, the example operations are described below within the context of builder computing system 102 of FIGS. 1 and 3.

As shown in FIG. 9, builder computing system 102 may receive an initial user input that causes builder computing system 102 to assemble a set of resources into a set of uncompiled targets of an application package that implements application 130 (900). For instance, the initial user input may cause builder computing system 102 to initially generate the application package for application 130. The application package may include a target set that comprises the set of resource and may also include one or more compiled targets that are compiled based on source code.

Builder computing system 102 may deploy the application package to initiate execution of application 130 (902). For instance, target environment system 124 may receive the application package from builder computing system 102. Target environment system 124 may store the resources of the application package in a predefined filesystem location of the target environment that is known by application 130. At a later time, after modification to at least a subset of resources, builder computing system 102 may receive a subsequent user input that causes builder computing system 102 to assemble an updated subset of the set of resources that are based on the subset of resources (904). Builder computing system 102 may deploy the updated subset of the set of resources to update the application based on the updated subset without sending another application package that includes the updated subset of the set of resources (940). In this way, builder computing system 102 may send the updated resources without re-generating a new application package with the complete target set for application 130.

In some examples, the updated subset of resources are stored in a temporary filesystem location of the target environment. Deploying the updated subset causes a coordinator component of target environment system 124 to update a name of the temporary filesystem location to a name of a predefined filesystem location of the target environment that is known by application 130. Application 130 may restart to execute with the updated subset of resources, based at least in part on the updated subset of resources being included in the predefined filesystem location of the target environment.

Figure 10:
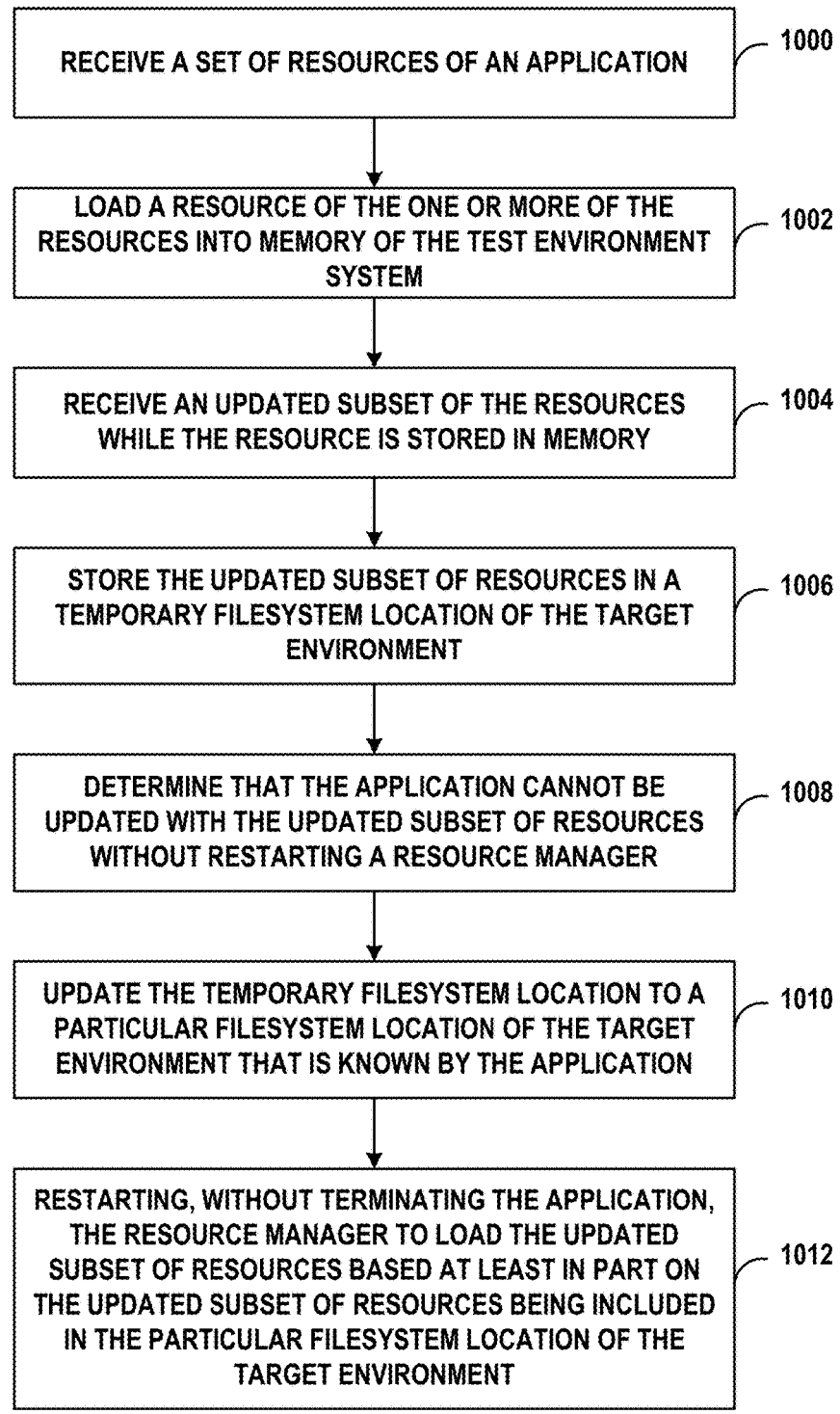
FIG. 10 is a flow diagram illustrating example operations of a test environment system configured to perform warm-swapping techniques, in accordance with techniques of this disclosure.

FIG. 10 is a flow diagram illustrating example operations of a test environment system configured to perform warm-swapping techniques, in accordance with techniques of this disclosure. For purposes of illustration only, the example operations are described below within the context of test environment system 124 of FIG. 4.

Test environment system 124 may initially receive a set of resources of application 130 (1000). For instance, builder computing system 102 may initially generate an application package for application 130 that is comprised of a target set where the target set include the set of resources and one or more compiled targets that are based on source code. Test environment system 124 may load a resource of the one or more of the resources into memory of test environment system 124 (1002). For instance test environment system 124 may load an image into memory, such that application 130 may display the image in a graphical user interface.

At a later time, a software developer may modify the image or substitute the contents of one image for another while retaining the same file name. The software developer may provide a user input that causes builder computing system 102 to assemble an updated subset of resources that includes the updated image. Upon assembling the updated subset of resources, builder computing system 102 may send the updated subset of resources to test environment system 124. Test environment system 124 may receive the subset of resources (1004). In response to receiving the subset of resources, test environment system 124 may store the subset of resources in a temporary filesystem location of the target environment system 124 (1006).

Test environment system 124 may determine that application 130 cannot be updated with the updated subset of resources without restarting a resource manager that provides application 130 with access to the resources (1008). Accordingly, test environment system 124 may update the temporary filesystem location to a predefined filesystem location of the target environment that is known by application 130 (1010). For instance, a predefined filesystem location that is known by an application may be hardcoded within the application or one or more components of a system runtime, or may be loaded from a configuration file into the application or one or more components of a system runtime. Upon updating the temporary filesystem location to a predefined filesystem location of the target environment that is known by the application, test environment system 124 may restart, without terminating application 130, the resource manager to load the updated subset of resources based at least in part on the updated subset of resources being included in the predefined filesystem location of the target environment system 124 (1012).

Example 1

A method comprising: in response to receiving an initial user input that causes a builder computing system to compile a set of source code for an application into a set of compiled targets, deploying, by the builder computing system, the set of compiled targets to initiate execution of the application, wherein a subset of the set of source code is compiled into an initial subset of the set of compiled targets; after modification to at least the subset of the set of source code, receiving, at the builder computing system, a subsequent user input that causes the builder computing system to compile at least the subset of the set of source code into an updated subset of the set of compiled targets; and in response to determining that the updated subset differs from the initial subset, deploying the updated subset of compiled targets to update the application without terminating execution of the application.

Example 2

The method of Example 1, further comprising: refraining from deploying other compiled targets in the set of compiled targets to update the application, wherein the other compiled targets are not included in the updated subset of the set of compiled targets.

Example 3

The method of any of Examples 1-2, wherein the application is executing at a test environment, wherein the test environment is at least one of an emulator executing at the builder computing system, a directory of the builder computing system, or a remote computing device that is operably coupled to the builder computing system.

Example 4

The method of any of Examples 1-3, wherein the update of the application updates a compiled target of the initial subset with a reference to a compiled target of the updated subset, wherein the compiled target of the initial subset is stored in memory of the test environment during execution of the application and prior to deployment of the updated set.

Example 5

The method of any of Examples 1-4, further comprising: injecting, by the builder computing system and into at least one compiled target of the target set, bytecode that represents a conditional statement, wherein the bytecode is injected within the compiled target prior to bytecode that represents program logic of a function in the application, wherein the conditional statement indicates whether an updated version of the function is loaded in memory of the test environment; and injecting, by the builder computing system and into the at least one compiled target, bytecode that invokes the updated version of the function responsive to the conditional statement being satisfied.

Example 6

The method of any of Examples 1-5, further comprising: in response to compiling at least the subset of the set of source code into the updated subset of the set of compiled targets, updating, by the builder computing device, a name of a compiled target of the updated subset, a name of a variable within the compiled target of the updated subset, or a name of a method within the compiled target of the updated subset, wherein the updated name indicates that the compiled target of the updated subset is changed in relation to a previous version of the compiled target.

Example 7

The method of any of Examples 1-6, wherein deploying, by the builder computing system, the set of compiled targets to initiate execution of the application further comprises packaging the set of compiled targets into a first application package that represents the application and sending the application package to a test environment, and wherein deploying the updated subset of compiled targets to update the application based on the updated subset further comprises sending the updated subset of compiled targets to the test environment without packaging the updated subset of compiled targets into a second application package that represents the application.

Example 8

The method of any of Examples 1-7, further comprising: in response to determining that a class in the subset of the set of source code includes at least two super constructors: injecting, by the builder computing device, a first set of bytecode that represents program logic that invokes a new constructor of the inserted by the builder computing device; and injecting, by the computing device, a second set of bytecode that represents the new constructor, wherein the new constructor invokes at least one of the two super constructors based at least in part on a parameter received from the first set of bytecode.

Example 9

A computing device comprising: one or more computer processors; and a memory comprising instructions that when executed by the one or more computer processors cause the one or more computer processors to perform any of the method of Examples 1-8.

Example 10

A non-transitory computer-readable storage medium encoded with instructions that, when executed, cause at least one processor of a computing device to perform any of the method of Examples 1-8.

Example 11

A apparatus comprising means for performing any of the method of Examples 1-8.

Example 12

A method comprising: in response to receiving a set of compiled targets, loading, by a test environment system, an original compiled target of the set of compiled targets into memory of the test environment system, wherein the original compiled target includes a conditional statement that indicates whether an changed version of the original compiled target is stored in memory of the test environment system; in response to receiving an updated subset of the set of compiled targets while the original compiled target is stored in memory, determining, by the test environment system, whether an updated compiled target includes an indicator that indicates the updated compiled target is changed in relation to the original compiled target; and in response to determining that the updated compiled target is changed in relation to the original version of the compiled target, executing, by the test environment and without terminating execution of the application, the updated compiled target in response to an invocation of program logic in the original compiled target.

Example 13

The method of Example 12, wherein a type of the original compiled target is the same as a type of the updated compiled target.

Example 14

The method of any of Examples 12-13, further comprising: in response to determining that the updated compiled target is changed in relation to the original version of the compiled target, determining, by the test environment system, a location of the updated compiled target in the memory of the test environment system; setting, by the test environment system, a variable in the original compiled target to the location of the updated compiled target in the memory of the test environment system; and wherein executing the updated compiled target in response to the invocation of program logic in the original compiled target comprises executing the updated compiled target based at least in part on the variable in the original compiled target.

Example 15

The method of any of Examples 12-14, wherein executing the updated compiled target in response to the invocation of program logic in the original compiled target further comprises: in response to the invocation of program logic in the original compiled target, determining, by the test environment, that the variable in the original compiled target includes the location of the updated compiled target in the memory of the test environment system; and in response to determining that the variable in the original compiled target includes the location of the updated compiled target in the memory of the test environment system, invoking program logic in the updated compiled target that corresponds, based at least in part on a name of the program logic of the updated compiled target, to program logic in the original compiled target.

Example 16

The method of any of Examples 12-15, wherein the indicator that indicates the updated compiled target is changed in relation to the original compiled target comprises a string that is prepended, inserted, or appended to at least one of a name of a compiled target of the updated subset, a name of a variable within the compiled target of the updated subset, or a name of a method within the compiled target of the updated subset.

Example 17

The method of any of Examples 12-16, wherein executing the compiled target further comprises: executing, by the builder computing device, a first set of bytecode that represents program logic that invokes a new constructor of the inserted by the builder computing device; and executing, by the computing device, a second set of bytecode that represents the new constructor, wherein the new constructor invokes at least one of two super constructors based at least in part on a parameter received from the first set of bytecode.

Example 18

A computing device comprising: one or more computer processors; and a memory comprising instructions that when executed by the one or more computer processors cause the one or more computer processors to perform any of the method of Examples 12-17.

Example 19

A non-transitory computer-readable storage medium encoded with instructions that, when executed, cause at least one processor of a computing device to perform any of the method of Examples 12-17.

Example 20

An apparatus comprising means for performing any of the method of Examples 12-17.

Example 21

A method comprising: in response to receiving an initial user input that causes a builder computing system to compile a set of source code into a set of compiled targets of an application package that implements an application, deploying, by the builder computing system, the application package to initiate execution of the application, wherein a subset of the set of source code is compiled into an initial subset of the set of compiled targets; after modification to at least the subset of the set of source code, receiving, at the builder computing system, a subsequent user input that causes the builder computing system to compile at least the subset of the set of source code into an updated subset of the set of compiled targets; and deploying the updated subset of compiled targets to update the application based on the updated subset without sending another application package that includes the updated subset of compiled targets.

Example 22

The method of Example 21, wherein the application is executing at a test environment and the updated subset of compiled targets are stored in a predefined filesystem location of the target environment that is known by the application, and wherein deploying the updated subset causes a coordinator component of the target environment to restart the application to execute with the updated subset of compiled targets, based at least in part on the updated compiled targets being included in the predefined filesystem location of the target environment.

Example 23

The method of any of Examples 21-22, wherein the test environment is at least one of an emulator executing at the builder computing system, a directory of the builder computing system, or a remote computing device that is operably coupled to the builder computing system.

Example 24

The method of any of Examples 21-23, wherein the application comprises program logic to load compiled targets included in the predefined file system location in reverse chronological order.

Example 25

The method of any of Examples 21-24, further comprising: sending, by the builder computing system, a command that causes the application to restart.

Example 26

The method of any of Examples 21-25, further comprising: wherein deploying the updated subset of compiled targets to update the application based on the updated subset without sending another application package comprises deploying the updated subset of compiled targets to update the application based on the updated subset without sending another application package base at least in part on determining that the application cannot be updated with the updated subset of compiled targets without restarting the application.

Example 27

The method of any of Examples 21-26, further comprising: inserting, by the builder computing system, path compaction program logic in the application package that when executed in a test environment system stores respective indices for at least two respective compiled targets and deletes a first compiled target of the at least two respective targets that is less recent than a more recent, second compiled target of the at least two respective compiled targets.

Example 28

A computing device comprising: one or more computer processors; and a memory comprising instructions that when executed by the one or more computer processors cause the one or more computer processors to perform any of the method of Examples 21-27.

Example 29

A non-transitory computer-readable storage medium encoded with instructions that, when executed, cause at least one processor of a computing device to perform any of the method of Examples 21-27.

Example 30

An apparatus comprising means for performing any of the method of Examples 20-27.

Example 31

A method comprising: in response to receiving a set of compiled targets of an application, loading, by a test environment system, one or more of the set of compiled targets into memory of the test environment system; in response to receiving an updated subset of the set of compiled targets while the original compiled target is stored in memory, storing, by the test environment system, the updated subset of compiled targets in a predefined filesystem location of the target environment that is known by the application; and in response to determining that the application cannot be updated with the updated subset of compiled targets without restarting the application, restarting, by the test environment system, the application to execute with the updated subset of compiled targets, based at least in part on the updated compiled targets being included in the predefined filesystem location of the target environment.

Example 32

The method of Example 31, wherein the predefined filesystem location of the target environment is known by the application, based at least in part on the predefined filesystem location of the target environment being included as a string within at least a configuration file for the application or a compiled target of the set of compiled targets.

Example 33

The method of any of Examples 31-32, further comprising: loading, by the application, updated compiled targets included in the predefined filesystem location of the target environment in reverse chronological order after restarting the application, wherein a first compiled target of the updated compiled targets that is more recently compiled than a second compiled target of the updated compiled targets is loaded into the memory of the test environment system without loading the second compiled target into the memory of the test environment system, wherein a type of the first compiled target is the same as a type of the second compiled target.

Example 34

The method of any of Examples 31-33, further comprising receiving, by the test environment system, a command that causes the application to restart.

Example 35

The method of any of Examples 31-34, wherein receiving the set of compiled targets of the application comprises receiving a first application package that represents the application and comprises the set of compiled targets of the application, and wherein receiving the updated subset of compiled targets comprises receiving the updated subset of compiled targets that are not included in a second application package that represents the application.

Example 36

The method of any of Examples 31-35, further comprising: determining, by the test environment system, that at least a first compiled target and a second compiled target that is based at least in part on the first compiled target are stored at the test environment system; and generating respective indices for the first compiled target and the second compiled target, wherein each respective index of the first compiled target and the second compiled target indicates a respective version of the first compiled target and the second compiled target.

Example 37

The method of any of Examples 21-36, further comprising: determining, by the test environment system, that a first version of the first compiled target is more recent than a second version of the second compiled target, wherein the first version is indicated by a first index of the first compiled target and the second version is indicated by a second index of the second compiled target; and deleting, by the test environment system and based at least in part on first version being more recent than the second version, the second compiled target.

Example 38

A computing device comprising: one or more computer processors; and a memory comprising instructions that when executed by the one or more computer processors cause the one or more computer processors to perform any of the method of Examples 31-37.

Example 39

A non-transitory computer-readable storage medium encoded with instructions that, when executed, cause at least one processor of a computing device to perform any of the method of Examples 31-37.

Example 40

An apparatus comprising means for performing any of the method of Examples 31-37.

Example 41

A method comprising: in response to receiving an initial user input that causes a builder computing system to assemble a set of resources into a set of uncompiled targets of an application package that implements an application, deploying, by the builder computing system, the application package to initiate execution of the application, wherein the set of uncompiled targets includes a subset of the set of resources; after modification to at least the subset of the set of resources, receiving, at the builder computing system, a subsequent user input that causes the builder computing system to assemble an updated subset of the set of resources that are based on the subset of the set of resources; and deploying the updated subset of the set of resources to update the application based on the updated subset without sending another application package that includes the updated subset of the set of resources.

Example 42

The method of Example 41, wherein the application is executing at a test environment system and the updated subset of resources are stored in a temporary filesystem location of the target environment, wherein deploying the updated subset causes a coordinator component of the target environment to update a name of the temporary filesystem location to a name of a predefined filesystem location of the target environment that is known by the application, and wherein deploying the updated subset causes the coordinator component of the target environment to restart the application to execute with the updated subset of resources, based at least in part on the updated subset of resources being included in the predefined filesystem location of the target environment.

Example 43

The method of any of Examples 41-42, wherein the predefined filesystem location of the target environment is known by the application, based at least in part on the predefined filesystem location of the target environment being included as a string within at least a configuration file for the application or a compiled target included in the application package.

Example 44

The method of any of Examples 41-43, wherein the test environment is at least one of an emulator executing at the builder computing system, a directory of the builder computing system, or a remote computing device that is operably coupled to the builder computing system.

Example 45

The method of any of Examples 41-44, further comprising: sending, by the builder computing system, a command that causes the application to restart and the coordinator component of the target environment to update the name of the temporary filesystem location to the name of the predefined filesystem location of the target environment that is known by the application.

Example 46

The method of any of Examples 41-45, further comprising: sending, by the builder computing system and with set of uncompiled targets, a set of updated compiled targets, wherein the updated compiled targets are generated based on modifications to source code, wherein original compiled targets were generated prior to the updated compiled targets based on the source without the modifications.

Example 47

The method of any of Examples 41-46, further comprising: in response to determining that the application package was previously deployed to the test environment system, refraining, by the builder computing system, from generating the other application package with the updated subset of the set of resources.

Example 48

A computing device comprising: one or more computer processors; and a memory comprising instructions that when executed by the one or more computer processors cause the one or more computer processors to perform any of the method of Examples 41-47.

Example 49

A non-transitory computer-readable storage medium encoded with instructions that, when executed, cause at least one processor of a computing device to perform any of the method of Examples 41-47.

Example 50

An apparatus comprising means for performing any of the method of Examples 41-47.

Example 51

A method comprising: in response to receiving a set of resources of an application, loading, by a test environment system, a resource of the one or more of the resources into memory of the test environment system; in response to receiving an updated subset of the resources while the resource is stored in memory, storing, by the test environment system, the updated subset of resources in a temporary filesystem location of the target environment; in response to determining that the application cannot be updated with the updated subset of resources without restarting a resource manager that provides the application with access to the resources, updating, by the test environment system, the temporary filesystem location to a predefined filesystem location of the target environment that is known by the application; and restarting, by the test environment system and without terminating the application, the resource manager to load the updated subset of resources based at least in part on the updated subset of resources being included in the predefined filesystem location of the target environment.

Example 52

The method of Example 51, wherein the application is executing at a test environment and the updated subset of compiled targets are stored in a temporary filesystem location of the target environment, wherein deploying the updated subset causes a coordinator component of the target environment to update a name of the temporary filesystem location to a name of a predefined filesystem location of the target environment that is known by the application, and wherein deploying the updated subset causes the coordinator component of the target environment to restart the application to execute with the updated subset of compiled targets, based at least in part on the updated compiled targets being included in the predefined filesystem location of the target environment.

Example 53

The method of any of Examples 51-52, wherein the resource manager prior to receiving the updated subset of the resources is a first instance of the resource manager, the method further comprising: after receiving the updated subset of the resources, instantiating a second instance of the resource manager as the resource manager; identifying, by the test environment system and using reflection, at least one compiled target loaded in memory that includes a reference to the first instance of the resource manager; and updating, by the test environment and using reflection, the at least one compiled target to include a reference to the second instance of the resource manager.

Example 54

The method of any of Examples 51-53, further comprising: outputting, by the test environment system and for display, at least one of the updated subset of resources without restarting the application.

Example 55

The method of any of Examples 51-54, wherein updating the temporary filesystem location to the predefined filesystem location of the target environment that is known by the application comprises renaming the temporary filesystem location to the predefined filesystem location.

Example 56

The method of any of Examples 51-55, further comprising: receiving, by the test environment system, a command that causes the application to restart and the coordinator component of the target environment to update the name of the temporary filesystem location to the name of the predefined filesystem location of the target environment that is known by the application.

Example 57

The method of any of Examples 51-56, further comprising: receiving, by test environment system and with the set of uncompiled targets, a set of updated compiled targets, wherein the updated compiled targets are generated based on modifications to source code, wherein original compiled targets were generated prior to the updated compiled targets based on the source without the modifications.

Example 58

A computing device comprising: one or more computer processors; and a memory comprising instructions that when executed by the one or more computer processors cause the one or more computer processors to perform any of the method of Examples 51-57.

Example 59

A non-transitory computer-readable storage medium encoded with instructions that, when executed, cause at least one processor of a computing device to perform any of the method of Examples 51-57.

Example 60

An apparatus comprising means for performing any of the method of Examples 51-57.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

In some examples, a computer-readable storage medium includes a non-transitory medium. In some examples, the term "non-transitory" indicates that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
in response to receiving an initial user input that causes a builder computing system to compile a set of source code for an application into a set of compiled targets, compiling the set of course code into the set of compiled targets;
injecting, by the builder computing system and into at least one compiled target of the set of compiled targets, bytecode that represents a conditional statement, wherein the bytecode is injected within the at least one compiled target of the set of compiled targets prior to bytecode that represents program logic of a function in the application, wherein the conditional statement indicates whether an updated version of the function is loaded in memory of a test environment;
deploying, by the builder computing system, the set of compiled targets to initiate execution of the application in the test environment, wherein a subset of the set of source code is compiled into an initial subset of the set of compiled targets;
after modification to at least the subset of the set of source code, receiving, at the builder computing system, a subsequent user input that causes the builder computing system to compile at least the subset of the set of source code into an updated subset of the set of compiled targets;
in response to determining that the updated subset differs from the initial subset, deploying, by the builder computing system and to the test environment, the updated subset of the set of compiled targets to update the application without terminating execution of the application in the test environment; and
in response to the conditional statement being satisfied, injecting, by the builder computing system and into the at least one compiled target of the set of compiled targets, bytecode that invokes the updated version of the function.

2. The method of claim 1, further comprising:
refraining from deploying other compiled targets in the set of compiled targets to update the application, wherein the other compiled targets are not included in the updated subset of the set of compiled targets.

3. The method of claim 1, wherein the test environment is at least one of an emulator executing at the builder computing system, a directory of the builder computing system, or a remote computing device that is operably coupled to the builder computing system.

4. The method of claim 1, wherein the update of the application updates a compiled target of the initial subset of the set of compiled targets with a reference to a compiled target of the updated subset of the set of compiled targets, wherein the compiled target of the initial subset of the set of compiled targets is stored in memory of the test environment during execution of the application and prior to deployment of the updated subset of the set of compiled targets.

5. The method of claim 1, further comprising:
in response to compiling at least the subset of the set of source code into the updated subset of the set of compiled targets, updating, by the builder computing device, a name of a compiled target of the updated subset of the set of compiled targets, a name of a variable within the compiled target of the updated subset of the set of compiled targets, or a name of a function within the compiled target of the updated subset of the set of compiled targets, wherein the updated name indicates that the compiled target of the updated subset of the set of compiled targets is changed in relation to a previous version of the compiled target.

6. The method of claim 1,
wherein deploying, by the builder computing system, the set of compiled targets to initiate execution of the application further comprises packaging the set of compiled targets of the set of compiled targets into a first application package that represents the application and sending the application package to the test environment, and
wherein deploying the updated subset of the set of compiled targets to update the application based on the updated subset of the set of compiled targets further comprises sending the updated subset of the set of compiled targets to the test environment without packaging the updated subset of the set of compiled targets into a second application package that represents the application.

7. The method of claim 1, further comprising:
in response to determining that a class in the subset of the set of source code includes at least two super constructors:
injecting, by the builder computing device, a first set of bytecode that represents program logic that invokes a new constructor; and
injecting, by the computing device, a second set of bytecode that represents the new constructor, wherein the new constructor invokes at least one of the two super constructors based at least in part on a parameter received from the first set of bytecode.

8. A computing device comprising:
one or more computer processors; and
a memory comprising instructions that, when executed by the one or more computer processors, cause the one or more computer processors to:
in response to receiving an initial user input that causes the computing device to compile a set of source code for an application into a set of compiled targets, compile the set of course code into the set of compiled targets;
inject, into at least one compiled target of the set of compiled targets, bytecode that represents a conditional statement, wherein the bytecode is injected within the at least one compiled target of the set of compiled targets prior to bytecode that represents program logic of a function in the application, wherein the conditional statement indicates whether an updated version of the function is loaded in memory of a test environment;
deploy the set of compiled targets to initiate execution of the application in a test environment, wherein a subset of the set of source code is compiled into an initial subset of the set of compiled targets;
after modification to at least the subset of the set of source code, receive a subsequent user input that causes the computing device to compile at least the subset of the set of source code into an updated subset of the set of compiled targets;
in response to determining that the updated subset of the set of compiled targets differs from the initial subset of the set of compiled targets, deploy the updated subset of the set of compiled targets to update the application without terminating execution of the application in a test environment; and in response to the conditional statement being satisfied, inject, into the at least one compiled target of the set of compiled targets, bytecode that invokes the updated version of the function.

9. The computing device of claim 8, wherein the instructions further cause the one or more computer processors to:

in response to compiling at least the subset of the set of source code into the updated subset of the set of compiled targets, update a name of a compiled target of the updated subset of the set of compiled targets, a name of a variable within the compiled target of the updated subset of the set of compiled targets, or a name of a function within the compiled target of the updated subset of the set of compiled targets, wherein the updated name indicates that the compiled target of the updated subset of the set of compiled targets is changed in relation to a previous version of the compiled target.

10. A non-transitory computer-readable storage medium encoded with instructions that, when executed, cause at least one processor of a computing device to:

in response to receiving an initial user input that causes the computing device to compile a set of source code for an application into a set of compiled targets, compile the set of course code into the set of compiled targets;

inject, into at least one compiled target of the set of compiled targets, bytecode that represents a conditional statement, wherein the bytecode is injected within the at least one compiled target of the set of compiled targets prior to bytecode that represents program logic of a function in the application, wherein the conditional statement indicates whether an updated version of the function is loaded in memory of a test environment;

deploy the set of compiled targets to initiate execution of the application in a test environment, wherein a subset of the set of source code is compiled into an initial subset of the set of compiled targets;

after modification to at least the subset of the set of source code, receive a subsequent user input that causes the computing device to compile at least the subset of the set of source code into an updated subset of the set of compiled targets;

in response to determining that the updated subset of the set of compiled targets differs from the initial subset of the set of compiled targets, deploy the updated subset of the set of compiled targets to update the application without terminating execution of the application in a test environment; and in response to the conditional statement being satisfied, inject, into the at least one compiled target of the set of compiled targets, bytecode that invokes the updated version of the function.

11. The non-transitory computer-readable storage medium of claim 10, wherein the instructions further cause the at least one processor of a computing device to:

in response to compiling at least the subset of the set of source code into the updated subset of the set of compiled targets, update a name of a compiled target of the updated subset of the set of compiled targets, a name of a variable within the compiled target of the updated subset of the set of compiled targets, or a name of a function within the compiled target of the updated subset of the set of compiled targets, wherein the updated name indicates that the compiled target of the updated subset of the set of compiled targets is changed in relation to a previous version of the compiled target.

12. A method comprising:

in response to receiving a set of compiled targets of an application, loading, by a test environment system, an original compiled target of the set of compiled targets into memory of the test environment system, wherein the original compiled target includes a conditional statement that indicates whether a changed version of the original compiled target is stored in memory of the test environment system;

executing, by the test environment system, the application;

in response to receiving an updated subset of the set of compiled targets while the original compiled target is stored in memory:

determining, by the test environment system, whether an updated compiled target includes an indicator that indicates the updated compiled target is changed in relation to the original compiled target;

in response to determining that the updated compiled target is changed in relation to the original compiled target, determining, by the test environment system, a location of the updated compiled target in the memory of the test environment system; and setting, by the test environment system, a variable in the original compiled target to the location of the updated compiled target in the memory of the test environment system;

determining whether the variable in the original compiled target includes the location of the updated compiled target in the memory of the test environment system; and in response to determining that the variable in the original compiled target includes the location of the updated compiled target in the memory of the test environment system, executing, by the test environment and without terminating execution of the application, the updated compiled target by at least invoking program logic in the updated compiled target that corresponds, based at least in part on a name of the program logic of the updated compiled target, to program logic in the original compiled target.

13. The method of claim 12, wherein a type of the original compiled target is the same as a type of the updated compiled target.

14. The method of claim 12, wherein the indicator that indicates the updated compiled target is changed in relation to the original compiled target comprises a string that is prepended, inserted, or appended to at least one of a name of a compiled target of the updated subset, a name of a variable within the compiled target of the updated subset, or a name of a function within the compiled target of the updated subset.

15. The method of claim 12, wherein executing the compiled target further comprises:

executing, by the test environment system, a first set of bytecode that represents program logic that invokes a new constructor; and executing, by the test environment system, a second set of bytecode that represents the new constructor, wherein the new constructor invokes, based at least in part on a parameter received from the first set of bytecode, at least one of two super constructors.

16. A test environment system comprising:
one or more computer processors; and
a memory comprising instructions that when executed by the one or more computer processors cause the one or more computer processors to:
- in response to receiving a set of compiled targets of an application, load an original compiled target of the set of compiled targets into memory of the test environment system, wherein the original compiled target includes a conditional statement that indicates whether a changed version of the original compiled target is stored in memory of the test environment system;
- execute the application;
- in response to receiving an updated subset of the set of compiled targets while the original compiled target is stored in memory:
  - determine whether an updated compiled target includes an indicator that indicates the updated compiled target is changed in relation to the original compiled target;
  - in response to determining that the updated compiled target is changed in relation to the original compiled target, determine a location of the updated compiled target in the memory of the test environment system; and
  - set a variable in the original compiled target to the location of the updated compiled target in the memory of the test environment system;
- determine whether the variable in the original compiled target includes the location of the updated compiled target in the memory of the test environment system; and
- in response to determining that the variable in the original compiled target includes the location of the updated compiled target in the memory of the test environment system, execute, without terminating execution of the application, the updated compiled target by at least invoking program logic in the updated compiled target that corresponds, based at least in part on a name of the program logic of the updated compiled target, to program logic in the original compiled target.

17. The test environment system of claim 16, wherein a type of the original compiled target is the same as a type of the updated compiled target.

18. The test environment system of claim 16, wherein the instructions that cause the one or more computer processors to execute the compiled target further cause the one or more computer processors to:
- execute a first set of bytecode that represents program logic that invokes a new constructor; and
- execute a second set of bytecode that represents the new constructor, wherein the new constructor invokes, based at least in part on a parameter received from the first set of bytecode, at least one of two super constructors.

19. A non-transitory computer-readable storage medium encoded with instructions that, when executed, cause at least one processor of a test environment system to:
- in response to receiving a set of compiled targets of an application, load an original compiled target of the set of compiled targets into memory of the test environment system, wherein the original compiled target includes a conditional statement that indicates whether a changed version of the original compiled target is stored in memory of the test environment system;
- execute the application;
- in response to receiving an updated subset of the set of compiled targets while the original compiled target is stored in memory:
  - determine whether an updated compiled target includes an indicator that indicates the updated compiled target is changed in relation to the original compiled target;
  - in response to determining that the updated compiled target is changed in relation to the original compiled target, determine a location of the updated compiled target in the memory of the test environment system; and
  - set a variable in the original compiled target to the location of the updated compiled target in the memory of the test environment system;
- determine whether the variable in the original compiled target includes the location of the updated compiled target in the memory of the test environment system; and
- in response to determining that the variable in the original compiled target includes the location of the updated compiled target in the memory of the test environment system, execute, without terminating execution of the application, the updated compiled target by at least invoking program logic in the updated compiled target that corresponds, based at least in part on a name of the program logic of the updated compiled target, to program logic in the original compiled target.

20. The non-transitory computer-readable storage medium of claim 19, wherein the instructions that cause the at least one processor to execute the compiled target further cause the at least one processor to:
- execute a first set of bytecode that represents program logic that invokes a new constructor; and
- execute a second set of bytecode that represents the new constructor, wherein the new constructor invokes, based at least in part on a parameter received from the first set of bytecode, at least one of two super constructors.

* * * * *